United States Patent
Ikeda

(10) Patent No.: US 12,488,496 B2
(45) Date of Patent: Dec. 2, 2025

(54) OBJECT POSITION ESTIMATION DEVICE, OBJECT POSITION ESTIMATION METHOD, AND RECORDING MEDIUM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 412 days.

(21) Appl. No.: 18/010,000

(22) PCT Filed: Jun. 23, 2020

(86) PCT No.: PCT/JP2020/024494
§ 371 (c)(1),
(2) Date: Dec. 13, 2022

(87) PCT Pub. No.: WO2021/260780
PCT Pub. Date: Dec. 30, 2021

(65) Prior Publication Data
US 2023/0230277 A1   Jul. 20, 2023

(51) Int. Cl.
*G06T 7/73* (2017.01)
*G06T 7/60* (2017.01)

(52) U.S. Cl.
CPC .............. *G06T 7/73* (2017.01); *G06T 7/60* (2013.01); *G06T 2207/20076* (2013.01); *G06T 2207/20081* (2013.01); *G06T 2207/30242* (2013.01)

(58) Field of Classification Search
CPC ... G06T 7/73; G06T 7/60; G06T 2207/20076; G06T 2207/20081; G06T 2207/30242
See application file for complete search history.

(56) References Cited

U.S. PATENT DOCUMENTS 11,842,509 B2 * 12/2023 Tate ................. G06V 10/82
2019/0050681 A1 * 2/2019 Tate ................. G06V 40/161
(Continued)

FOREIGN PATENT DOCUMENTS

CN           107707871 A    2/2018
JP           2018-147431 A  9/2018
(Continued)

OTHER PUBLICATIONS

CN Office Action for CN Application No. 202080102293.8, mailed on Jan. 6, 2025 with English Translation.
(Continued)

*Primary Examiner* — Shefali D Goradia
(74) *Attorney, Agent, or Firm* — Sughrue Mion, PLLC

(57) ABSTRACT

An object position estimation device (1) is provided with: a feature extraction unit (10) including a first feature extraction unit (21) which generates a first feature map by subjecting a target image to a convolution computation process, and a second feature extraction unit (22) which generates a second feature map by also subjecting the first feature map to the convolution computation process; and a likelihood map estimation unit (20) including a first position likelihood estimation unit (23) which, by using the first feature map, estimates a first likelihood map indicating the probability that first objects having a first size are present in the target image, and a second position likelihood estimation unit (24) which, by using the second feature map, estimates a second likelihood map indicating the probability that second objects having a second size, which is greater than the first size, are present in the target image.

11 Claims, 14 Drawing Sheets

(56) References Cited

U.S. PATENT DOCUMENTS

2019/0205668 A1 7/2019 Noda et al.
2020/0005480 A1* 1/2020 Murase .................. G06N 20/00

FOREIGN PATENT DOCUMENTS

| JP | 2019-032773 A | | 2/2019 |
|---|---|---|---|
| JP | 2019-096072 A | | 6/2019 |
| JP | 2019139618 A | * | 8/2019 |
| JP | 2020-016928 A | | 1/2020 |
| JP | 2020-027405 A | | 2/2020 |

OTHER PUBLICATIONS

International Search Report for PCT Application No. PCT/JP2020/024494, mailed on Aug. 11, 2020.
English translation of Written opinion for PCT Application No. PCT/JP2020/024494, mailed on Aug. 11, 2020.
P. Viola, et al., "Rapid Object Detection Using a Boosted Cascade of Simple Features", IEEE, 2001, CVPR (Conference on Computer Vision and Pattern Recognition), pp. 511-518.

* cited by examiner

OBJECT POSITION ESTIMATION DEVICE, OBJECT POSITION ESTIMATION METHOD, AND RECORDING MEDIUM

This application is a National Stage Entry of PCT/JP2020/024494 filed on Jun. 23, 2020, the contents of all of which are incorporated herein by reference, in their entirety.

TECHNICAL FIELD

The present invention relates to an object position estimation device, an object position estimation method, and a recording medium, and more particularly, to an object position estimation device, an object position estimation method, and a recording medium for estimating positions of objects in an image.

BACKGROUND ART

Related techniques for estimating the position of an object in an image are known (PTLs 1 and 2). In the related technique described in NPL 1, an estimator learns identification of an object by using a sample image showing the entire object. The estimator thus trained scans the image in order to estimate the position of the object in the image. Specifically, in the related technology described in NPL 1, for example, an estimator estimates a Haar-Like feature amount of an object in an image, and estimates an object area for the identified object. At this time, the estimator scans each partial region while changing the position and size of each partial region in the image.

CITATION LIST

Patent Literature

[PTL 1] JP 2019-096072 A [PTL 2] JP 2018-147431 A

Non-Patent Literature

[NPL 1] "Rapid Object Detection Using a Boosted Cascade of Simple Features", P. Viola, et al., CVPR (Conference on Computer Vision and Pattern Recognition), pp.511-518

SUMMARY OF INVENTION

Technical Problem

The processing speed of a computer is limited. Therefore, it is difficult to continuously and comprehensively change the position and size of the partial region in the image when the estimator scans the image. In a case where a part or the whole of an object is shielded by another object in an image, it may be difficult to specify an object area in the image and accurately estimate the position of each object.

The present invention has been made in view of the above problems, and an object of the present invention is to provide an object position estimation device, a method thereof, and a recording medium capable of estimating the position of each object robustly and with high accuracy even when objects overlap each other in an image.

Solution to Problem

An object position estimation device according to an aspect of the present invention includes: a feature extraction means including a first feature extraction means configured to generate a first feature map by performing convolution processing on a target image, and a second feature extraction means configured to generate a second feature map by further performing convolution processing on the first feature map; and a likelihood map estimation means including a first position likelihood estimation means configured to estimate, by using the first feature map, a first likelihood map indicating a probability that an object having a first size is present at each position of the target image, and a second position likelihood estimation means configured to estimate, by using the second feature map, a second likelihood map indicating a probability that an object having a second size larger than the first size is present at each position of the target image.

An object position estimation method according to an aspect of the present invention includes: generating a first feature map by performing convolution processing on a target image, and generating a second feature map by further performing convolution processing on the first feature map; and estimating a first likelihood map indicating a probability that an object having a first size is present at each position of the target image using the first feature map, and estimating a second likelihood map indicating a probability that an object having a second size larger than the first size is present at each position of the target image using the second feature map.

A recording medium according to an aspect of the present invention causes a computer to execute: generating a first feature map by performing convolution processing on a target image, and generating a second feature map by further performing convolution processing on the first feature map; and estimating a first likelihood map indicating a probability that an object having a first size is present at each position of the target image using the first feature map, and estimating a second likelihood map indicating a probability that an object having a second size larger than the first size is present at each position of the target image using the second feature map.

Advantageous Effects of Invention

According to one aspect of the present invention, even if objects overlap each other in an image, the position of each object can be estimated robustly and with high accuracy.

EXAMPLE EMBODIMENT

Example Embodiment 1

Figure 1:
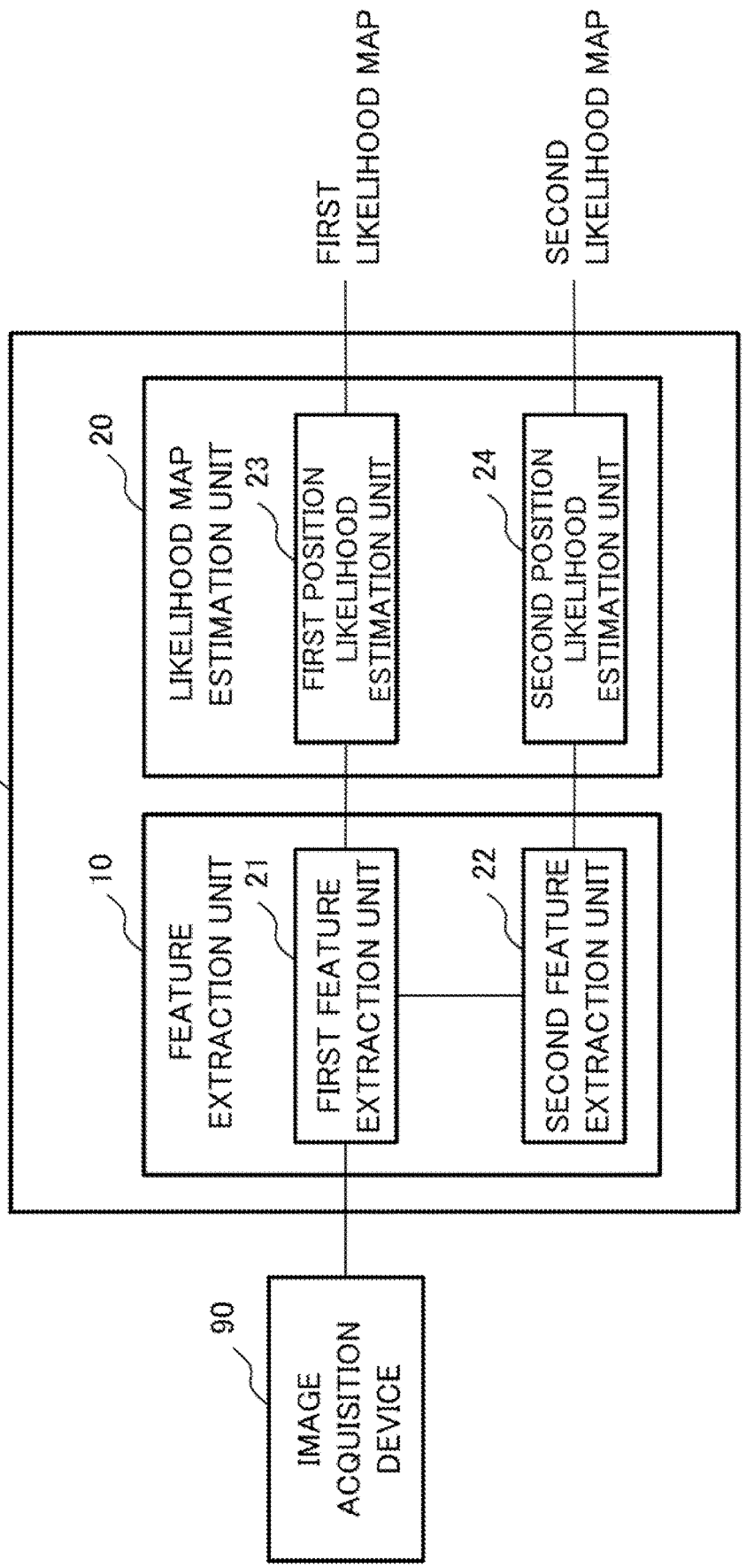
FIG. 1 is a block diagram illustrating a configuration of an object position estimation device according to Example Embodiment 1.

Example Embodiment 1 will be described with reference to FIG. 1.
(System)
A system according to the present Example Embodiment 1 will be described with reference to FIG. 1. FIG. 1 schematically illustrates a configuration of the system according to the present Example Embodiment 1. As illustrated in FIG. 1, the system according to the present Example Embodiment 1 includes an image acquisition device 90 and an object position estimation device 1. The image acquisition device 90 acquires one or more images. For example, the image acquisition device 90 acquires an image frame of a still image output from a video device such as a camera or a moving image output from a video device such as a video.

The image acquisition device 90 transmits the acquired one or more images (for example, an image frame of a still image or a moving image) to the object position estimation device 1. Hereinafter, the image transmitted from the image acquisition device 90 to the object position estimation device 1 is referred to as a target image 70. The operation of the object position estimation device 1 is controlled by, for example, a computer program.
(Object Position Estimation Device 1)
As illustrated in FIG. 1, the object position estimation device 1 includes a feature extraction unit 10 and a likelihood map estimation unit 20. The likelihood map estimation unit 20 is an example of a likelihood map estimation means.

The feature extraction unit 10 includes a first feature extraction unit 21 and a second feature extraction unit 22. The likelihood map estimation unit 20 includes a first position likelihood estimation unit 23 and a second position likelihood estimation unit 24. The object position estimation device 1 may include three or more feature extraction units and three or more position likelihood estimation units. The first feature extraction unit 21 and the second feature extraction unit 22 are examples of a first feature extraction means and a second feature extraction means. The first position likelihood estimation unit 23 and the second position likelihood estimation unit 24 are examples of a first position likelihood estimation means and a second position likelihood estimation means.

The first feature extraction unit 21 generates a first feature map indicating a feature of an object by performing convolution processing on the target image 70. Specifically, the first feature extraction unit 21 applies the first filter to a matrix in which the target image 70 is represented by pixel values while sliding the first filter by a predetermined movement amount. The first filter is a matrix (kernel) multiplied by a portion (referred to as a partial region) of a matrix representing the target image 70 by pixel values. The first feature extraction unit 21 outputs a sum of values obtained by matrix operation between a part of a matrix representing the target image 70 by pixel values and a matrix representing the first filter as an element of the first feature map. The first feature extraction unit 21 outputs a first feature map including a plurality of elements to the first position likelihood estimation unit 23 of the likelihood map estimation unit 20.

The second feature extraction unit 22 further performs convolution processing on the first feature map to generate a second feature map indicating the feature of the object. Specifically, the second feature extraction unit 22 applies the second filter to the first feature map while sliding the second filter by a predetermined movement amount, and outputs a sum of values obtained by matrix operation between a part of the matrix of the first feature map and a matrix representing the second filter as an element of the second feature map. Specifically, the second filter is a matrix multiplied by a part of the first feature map. The second feature extraction unit 22 outputs the second feature map including a plurality of elements to the second position likelihood estimation unit 24 of the likelihood map estimation unit 20.

Using the first feature map received from the first feature extraction unit 21, the first position likelihood estimation unit 23 estimates a first likelihood map indicating a probability that an object having a first size is present at each position of the target image 70. Specifically, as the first position likelihood estimation unit 23, an estimation unit (in one example, a CNN; Convolutional Neural Network). The trained estimation unit estimates (the likelihood map of) the position of the object having the first size in the target image 70 from the first feature map. The first size indicates any shape and size included in a first predetermined range (described later) in the target image 70.

The first position likelihood estimation unit 23 calculates the object likelihood of the first size, that is, the probability of being an object having the first size for each partial region of the target image 70. The first position likelihood estimation unit 23 estimates the first likelihood map representing the object likelihood of the first size calculated for each partial region of the target image 70 by likelihood. The likelihood at each coordinate of the first likelihood map indicates a probability that an object having the first size is present at a relevant position in the target image 70. The first position likelihood estimation unit 23 outputs the first likelihood map estimated in this manner.

The second position likelihood estimation unit 24 estimates a second likelihood map indicating a probability that an object having a second size is present at each relevant position in the target image 70 using the second feature map. Specifically, the second feature extraction unit 22 calculates an object likelihood of the second size, that is, a probability of being an object having the second size for each partial region of the target image 70. The second feature extraction unit 22 estimates a second likelihood map representing the object likelihood of the second size for each partial region of the target image 70 by likelihood. The likelihood at each coordinate of the second likelihood map indicates a probability that an object having the second size is present at a relevant position in the target image 70. The second position likelihood estimation unit 24 outputs the second likelihood map estimated in this manner. The second size indicates any size within a second predetermined range (described later) in the target image 70.

Hereinafter, the object may be referred to as "object having the first size" in the same meaning as "object of the first size". There is a case where the "object having the second size" is referred to in the same meaning as the "object of the second size".

Alternatively, the first position likelihood estimation unit 23 and the second position likelihood estimation unit 24 estimate the positions of objects having different attributes for each attribute of objects classified in advance. Then, the first position likelihood estimation unit 23 and the second position likelihood estimation unit 24 estimate the first likelihood map/the second likelihood map for each attribute of the object, and output the first likelihood map/the second likelihood map for each attribute of the object. The first position likelihood estimation unit 23 and the second position likelihood estimation unit 24 may be configured by different networks or may be configured by a single network for each attribute. In this case, both the first position likelihood estimation unit 23 and the second position likelihood estimation unit 24 output the plurality of likelihood maps in the channel direction of the attribute.

(Effects of Present Example Embodiment)

According to the configuration of the present example embodiment, the first feature extraction unit 21 of the feature extraction unit 10 generates the first feature map indicating the feature of the object by performing convolution processing on the target image 70. The second feature extraction unit 22 of the feature extraction unit 10 further performs convolution processing on the first feature map to generate the second feature map indicating the feature of the object. The first position likelihood estimation unit 23 of the likelihood map estimation unit 20 estimates, using the first feature map, a first likelihood map indicating a probability that an object having the first size is present at each position of the image. The second position likelihood estimation unit 24 of the likelihood map estimation unit 20 estimates, using the second feature map, a second likelihood map indicating a probability that an object having the second size larger than the first size is present at each position of the image.

As described above, the object position estimation device 1 uses the first feature map and the second feature map to separately estimate the positions of the object having the first size and the object having the second size in the target image 70. Therefore, even if objects overlap each other in the image, the position of each object can be estimated robustly and with high accuracy.

Example Embodiment 2

Example Embodiment 2 will be described with reference to FIGS. 2 and 3.

(Object Position Estimation Device 2)

Figure 2:
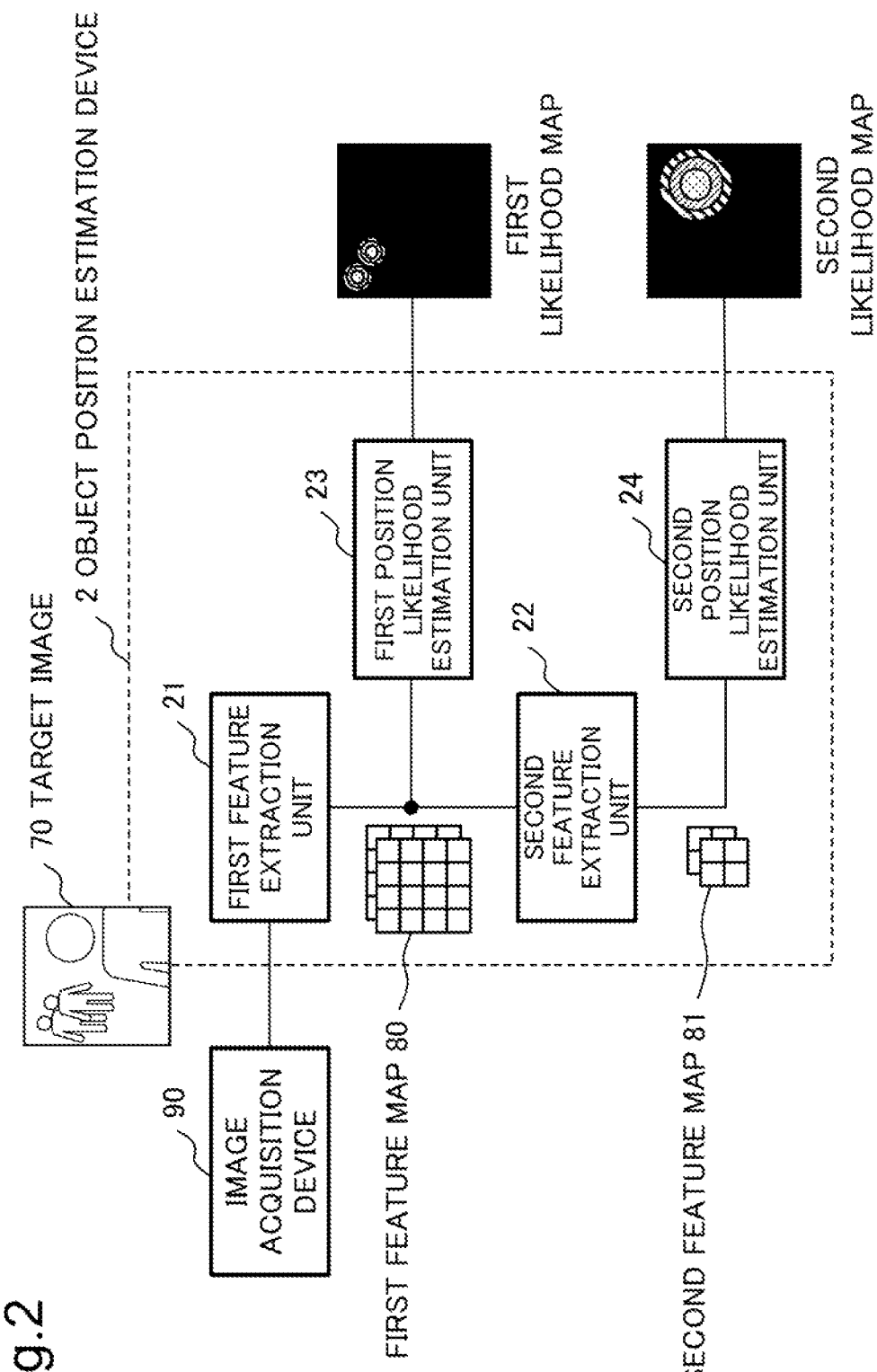
FIG. 2 is a block diagram illustrating a configuration of a system including an object position estimation device according to Example Embodiment 2.

As illustrated in FIG. 2, an object position estimation device 2 includes a first feature extraction unit 21, a second feature extraction unit 22, a first position likelihood estimation unit 23, and a second position likelihood estimation unit 24.

The object position estimation device 2 acquires the target image 70 from the image acquisition device 90. The object position estimation device 2 estimates the position of a predetermined type of object (hereinafter, simply referred to as an object) included in the target image 70. For example, the object position estimation device 2 estimates the position of a person, a car, a tree, an animal, an umbrella, or a part thereof. Hereinafter, an example in which the object is a human head will be described.

In the present Example Embodiment 2, the likelihood at each coordinate of the first likelihood map/the second likelihood map output by the object position estimation device 2 indicates the probability that the head (which is an example of the object) of a person having the first size/the second size is present at each relevant position in the target image 70. The likelihoods in the first likelihood map/the second likelihood map are normalized such that the sum of the likelihood in each of the first likelihood map/the second likelihood map matches the number of heads of persons having the first size/the second size appearing in the target image 70. As a result, the sum of the entire likelihood in each of the first likelihood map/the second likelihood map relates to the total number, in the target image 70, of persons having the first size/the second size appearing in the target image 70. Normalization of the likelihood in the first likelihood map/the second likelihood map is not essential.

The first feature extraction unit 21 performs convolution processing on the target image 70 to generate a first feature map 80 indicating the feature of the object. For example, the first feature extraction unit 21 may be a convolutional neural network (CNN). The first feature extraction unit 21 outputs the first feature map 80 to each of the first position likelihood estimation unit 23 and the second feature extraction unit 22.

The first feature map 80 is input from the first feature extraction unit 21 to the first position likelihood estimation unit 23. The first position likelihood estimation unit 23 estimates the first likelihood map by performing convolution processing on the first feature map 80. For example, the first position likelihood estimation unit 23 is enabled to function as a convolutional neural network separately from or integrally with the first feature extraction unit 21. As described above, the likelihood at each coordinate of the first likelihood map indicates the probability that the object of the first size is present at each relevant position in the target image 70. As described above, the first size indicates any shape and size included in a first predetermined range (described later) in the target image 70. The first position likelihood estimation unit 23 outputs the estimated first likelihood map.

The second feature extraction unit 22 acquires the first feature map 80 from the first feature extraction unit 21. The second feature extraction unit 22 further performs convolution processing on the first feature map 80 to generate a second feature map 81 indicating the feature of the object. The data size of the second feature map 81 is smaller than the data size of the first feature map 80. The second feature extraction unit 22 outputs the second feature map 81 to the second position likelihood estimation unit 24.

As described above, the data size of the first feature map 80 is relatively larger than the data size of the second feature map 81. That is, each element of the first feature map 80 is related to a feature of a small partial region of the target image 70. Therefore, the first feature map 80 is suitable for capturing fine features of the target image 70. On the other hand, each element of the second feature map 81 is related to a feature of a large partial region of the target image 70. Therefore, the second feature map 81 is suitable for capturing a rough feature of the target image 70.

In FIG. 2, the first feature extraction unit 21 and the second feature extraction unit 22 of the object position estimation device 2 are illustrated as separate functional blocks. However, the first feature extraction unit 21 and the second feature extraction unit 22 may constitute one integrated network. In this case, the first half of the integrated network corresponds to the first feature extraction unit 21, and the second half of the integrated network corresponds to the second feature extraction unit 22.

The second feature map 81 is input from the second feature extraction unit 22 to the second position likelihood estimation unit 24. The second position likelihood estimation unit 24 estimates the second likelihood map by performing convolution processing on the second feature map 81. As described above, the likelihood at each coordinate of the second likelihood map indicates the probability that the object having the second size is present at each relevant position in the target image 70. As described above, the second size indicates any size within a second predetermined range (described later) in the target image 70.

Alternatively, the second feature extraction unit 22 may generate the second feature map from the target image 70 itself. In this case, the second feature extraction unit 22 acquires the target image 70 instead of the first feature map 80. The second feature extraction unit 22 generates the second feature map 81 by performing convolution processing on the target image 70.

In FIG. 2, the first feature extraction unit 21, the second feature extraction unit 22, the first position likelihood estimation unit 23, and the second position likelihood estimation unit 24 of the object position estimation device 2 are illustrated as separate functional blocks. However, the first feature extraction unit 21, the second feature extraction unit 22, the first position likelihood estimation unit 23, and the second position likelihood estimation unit 24 may constitute one integrated network.

The first position likelihood estimation unit 23 estimates the position of the object of the first size within the first predetermined range. In other words, in a case where the object presents in the target image 70 has the first size, the first position likelihood estimation unit 23 estimates the first likelihood map.

On the other hand, the second position likelihood estimation unit 24 estimates the position of the object of the second size within the second predetermined range. That is, in a case where the object presents in the target image 70 has the second size, the position of the object is estimated by the second position likelihood estimation unit 24. The second size is greater than the first size. The first predetermined range defining the first size and the second predetermined range defining the second size are determined in advance so as not to overlap each other.

For example, the first predetermined range and the second predetermined range are determined on the basis of the data sizes of the related first feature map 80 and the related second feature map 81, respectively. For example, the reference size (hereinafter, referred to as a first reference size) of the object in the target image 70 is first determined using the first feature map 80. Next, another reference size (hereinafter, referred to as a second reference size) of the object in the target image 70 is determined using the second feature map 81.

Specifically, the first reference size is T1, and the second reference size is T2. At this time, the first predetermined range is determined as $a*T1 < k \le b*T1$ using the first reference size T1 and the constants a and b ($0<a<b$). Here, k represents the size of the object. On the other hand, the second predetermined range is determined as $c*T2 \le k < d*T2$ using the second reference size T2 and the constants c and d ($0<c<d$).

The constants (a, b) for defining the first predetermined range and the constants (c, d) for defining the second predetermined range may be equal to or different from each other. The condition of $b*T1=c*T2$ is preferably satisfied so that there is no gap between the first predetermined range and the second predetermined range.

The reference size and the predetermined range will be supplemented. As described above, each reference size is determined based on the data size of each feature map, and specifically, each reference size is determined to be a size proportional to the reciprocal of the data size of each feature map. The reference size and the predetermined range have a proportional relationship. Therefore, each predetermined range is determined with a size proportional to the reciprocal of the data size of each feature map.

A training method of each unit (that is, the first feature extraction unit 21, the second feature extraction unit 22, the first position likelihood estimation unit 23, and the second position likelihood estimation unit 24) included in the object position estimation device 2 according to the present Example Embodiment 2 will be described in Example Embodiment 6 to be described later. The training function may be provided in the object position estimation device 2 or may be provided in another device other than the object position estimation device 2. In the latter case, the object position estimation device 2 acquires each unit trained in advance by another device.

The "acquiring each trained unit" described herein may be acquiring a network itself (that is, the program in which the trained parameter is set) related to each unit, or may be acquiring only a trained parameter. In the latter case, the object position estimation device 2 acquires a trained parameter from another device, and sets the trained parameter in a program prepared in advance in a recording medium of the object position estimation device 2.

As described above, the first feature map 80 is suitable for capturing fine features of the target image 70. The first position likelihood estimation unit 23 estimates the position of the object having the first size (the object appearing small on the image) in the target image 70 using the first feature map 80. On the other hand, the second feature map 81 is suitable for capturing a rough feature of the target image 70. The second position likelihood estimation unit 24 uses the second feature map 81 to estimate the position of the object having the second size larger than the first size (an object appearing large on the image).

The object position estimation device 2 according to the present Example Embodiment 2 can efficiently estimate the positions of the object having the first size and the object having the second size in the target image 70 by using the first feature map 80 and the second feature map 81 in combination.

The first position likelihood estimation unit 23 may calculate the total number of objects having the first size in the target image 70 by summing the entire likelihoods of the normalized first likelihood maps. The second position likelihood estimation unit 24 may calculate the total number of objects having the second size by summing the entire likelihoods of the normalized second likelihood maps. Further, the object position estimation device 2 may calculate the total number of objects of the first size or the second size in the target image 70 by summing the total number of objects having the first size and the total number of objects having the second size obtained by the above method.

(Operation of Object Position Estimation Device 2)

The operation of the object position estimation device 2 according to the present Example Embodiment 2 will be described in detail with reference to FIG. 3. FIG. 3 is a flowchart illustrating the operation of the object position estimation device 2.

Figure 3:
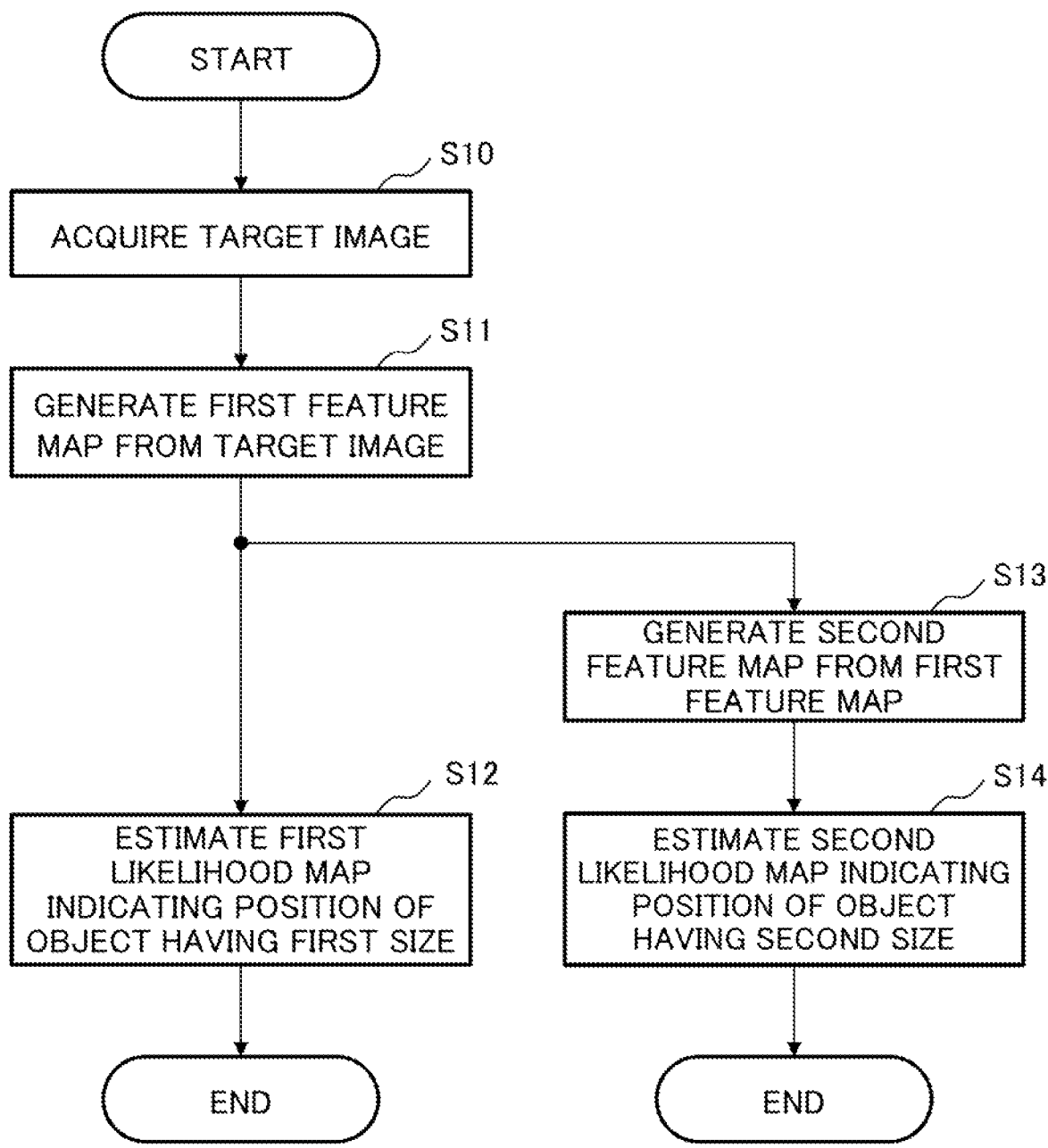
FIG. 3 is a flowchart illustrating a flow of processing executed by each unit of the object position estimation device according to Example Embodiment 2.

As illustrated in FIG. 3, the first feature extraction unit 21 acquires the target image 70 from the image acquisition device 90 (Step S10).

The first feature extraction unit 21 generates the first feature map 80 by performing convolution processing on the target image 70 (Step S11). The first feature extraction unit 21 outputs the first feature map 80 to the first position likelihood estimation unit 23 and the second feature extraction unit 22.

The first position likelihood estimation unit 23 estimates the first likelihood map indicating the position of the object having the first size by performing convolution processing on the first feature map 80 (Step S12). The first position likelihood estimation unit 23 outputs the estimated first likelihood map.

The second feature extraction unit 22 acquires the first feature map 80 from the first feature extraction unit 21, and generates the second feature map 81 by performing convolution processing on the first feature map 80 (Step S13).

The second position likelihood estimation unit 24 estimates the second likelihood map indicating the position of the object having the second size by performing convolution processing on the second feature map 81 (Step S14). The second position likelihood estimation unit 24 outputs the estimated second likelihood map.

Steps S12, S13, and S14 described above may be sequentially executed. The order between the processes of Steps S12, S13, and S14 may be switched. However, the processing in Step S14 needs to be executed after the processing in Step S13.

Thus, the operation of the object position estimation device 2 ends.

The configuration in which the object position estimation device 2 includes two feature extraction units (that is, the first feature extraction unit 21 and the second feature extraction unit 22) and two likelihood map estimation units (that is, the first position likelihood estimation unit 23 and the second position likelihood estimation unit 24) has been described above. However, the object position estimation device 2 may include three or more feature extraction units and three or more position likelihood estimation units (Modification 1).

(Modification 1)

Figure 4:
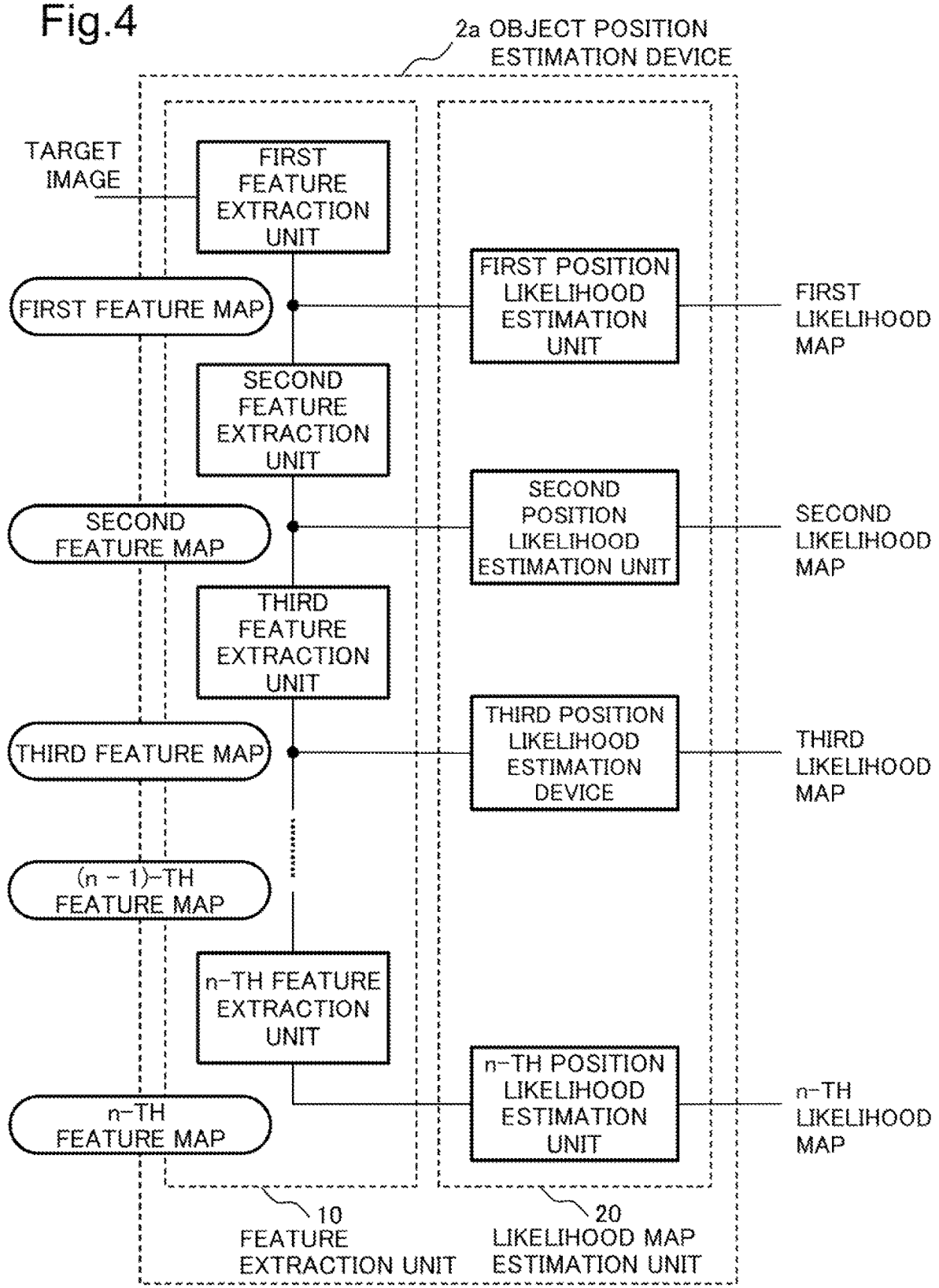
FIG. 4 is a block diagram illustrating a configuration of an object position estimation device according to a modification of Example Embodiment 2.

FIG. 4 illustrates a configuration of an object position estimation device 2a according to Modification 1. As illustrated in FIG. 4, the object position estimation device 2a includes n (n is an integer of 3 or more) feature extraction units and n position likelihood estimation units. The first feature map is obtained by the first feature extraction unit performing convolution processing on the target image. The second feature map, the third feature map, . . . , and the n-th feature map are obtained by the i-th feature extraction unit performing convolution processing on the feature map of the preceding stage. Here, i is an integer from 2 to n.

Specifically, the i-th feature extraction unit of the object position estimation device 2a generates the i-th feature map by performing convolution processing on the (i-1)-th feature map. In Modification 1 illustrated in FIG. 4, a network in which the first feature extraction unit to the n-th feature extraction unit are connected can be regarded as one integrated feature extraction unit 10.

The i-th feature map (i=1 to n) is input to the i-th position likelihood estimation unit. The i-th position likelihood estimation unit estimates the position of the object having the i-th size by performing convolution processing on the i-th feature map. Then, the i-th position likelihood estimation unit estimates and outputs the i-th likelihood map indicating the position of the object having the i-th size. In Modification 1 illustrated in FIG. 4, all the feature extraction units and all the likelihood estimation units can be enabled to function as one integrated neural network.

According to the configuration of Modification 1, it is possible to estimate and output three or more likelihood maps indicating positions of objects having three or more different sizes from each other from the target image. That is, the object position estimation device 2a according to Modification 1 can estimate the positions of objects having three or more sizes different from each other.

(Modification 2)

In Modification 2, the first position likelihood estimation unit 23 and the second position likelihood estimation unit 24 estimate the position of the object for each attribute of the object classified in advance. Then, the first position likelihood estimation unit 23 and the second position likelihood estimation unit 24 estimate the first likelihood map/the second likelihood map for each attribute of the object, and output the estimated first likelihood map/second likelihood map.

For example, if the object is a person or a portion of a person, the attribute may relate to the person itself, such as the age of the person, the gender of the person, the orientation of the person's face, the speed of movement of the person, or the affiliation of the person (a social person, a student, a family member, or the like). Alternatively, the attribute may relate to a group constituted by an object, such as a line or stay of a crowd including people, or a state (for example, panic) of a crowd including people.

In one example, the attributes of a person (object) are classified into two categories of a child and an adult. In this case, the first position likelihood estimation unit 23 estimates the positions of the child and the adult of the first size in the target image 70. On the other hand, the second position likelihood estimation unit 24 estimates the positions of a child and an adult of the second size in the target image 70.

The first position likelihood estimation unit 23 and the second position likelihood estimation unit 24 may be configured as a neural network that outputs the position of the child and the position of the adult to each channel. In this case, the first position likelihood estimation unit 23 estimates the position of the child of the first size and the position of the adult of the first size in the target image 70, and outputs the estimated positions as channels. The second position likelihood estimation unit 24 estimates the position of the child of the second size and the position of the adult of the second size in the target image 70, and outputs the estimated positions as channels.

According to the second modification, the first position likelihood estimation unit 23 and the second position likelihood estimation unit 24 set the attribute of the object (in the above example, a child and an adult) as the channel of the neural network, and estimate the position of the object having the size determined by each position likelihood estimation unit as the likelihood map for each attribute. As a result, the first position likelihood estimation unit 23 and the second position likelihood estimation unit 24 can estimate the position of the object for each size of the object and for each attribute.

(Effects of Present Example Embodiment)

According to the configuration of the present example embodiment, the first feature extraction unit 21 of the feature extraction unit 10 generates the first feature map indicating the feature of the object by performing convolution processing on the target image 70. The second feature extraction unit 22 of the feature extraction unit 10 further performs convolution processing on the first feature map to generate the second feature map indicating the feature of the object. The first position likelihood estimation unit 23 of the likelihood map estimation unit 20 estimates, using the first feature map, a first likelihood map indicating a probability that an object having the first size is present at each position of the image. The second position likelihood estimation unit 24 of the likelihood map estimation unit 20 estimates, using the second feature map, a second likelihood map indicating a probability that an object having the second size larger than the first size is present at each position of the image.

As described above, the object position estimation device 1 estimates the positions of the object having the first size and the object having the second size in the target image 70 separately using the first feature map and the second feature map. Therefore, even if the objects overlap each other in the image, the object position estimation device 1 can estimate the positions of the objects robustly and with high accuracy.

According to the configuration of the present example embodiment, it is not necessary to change the size and position of the partial region where the object is detected when scanning the target image 70 as in the related technology. Therefore, the object position estimation device 2 can accurately estimate the position of the object without depending on the arrangement of the partial regions.

Further, according to the configuration of the present example embodiment, the first likelihood map/the second likelihood map are normalized such that the sum of the entire likelihood of the first likelihood map/the second likelihood map is equal to each total number of objects having the first size/the second size in the target image 70.

Therefore, the object position estimation device 2 can obtain the total number of objects having the first size and the total number of objects having the second size in the target image 70, and the total number of objects included in the image 70 by the sum of the likelihood in the entire first likelihood map and the sum of the likelihoods in the entire second likelihood map.

Example Embodiment 3

Example Embodiment 3 will be described with reference to FIG. 5.

(Object Position Estimation Device 3)

Figure 5:
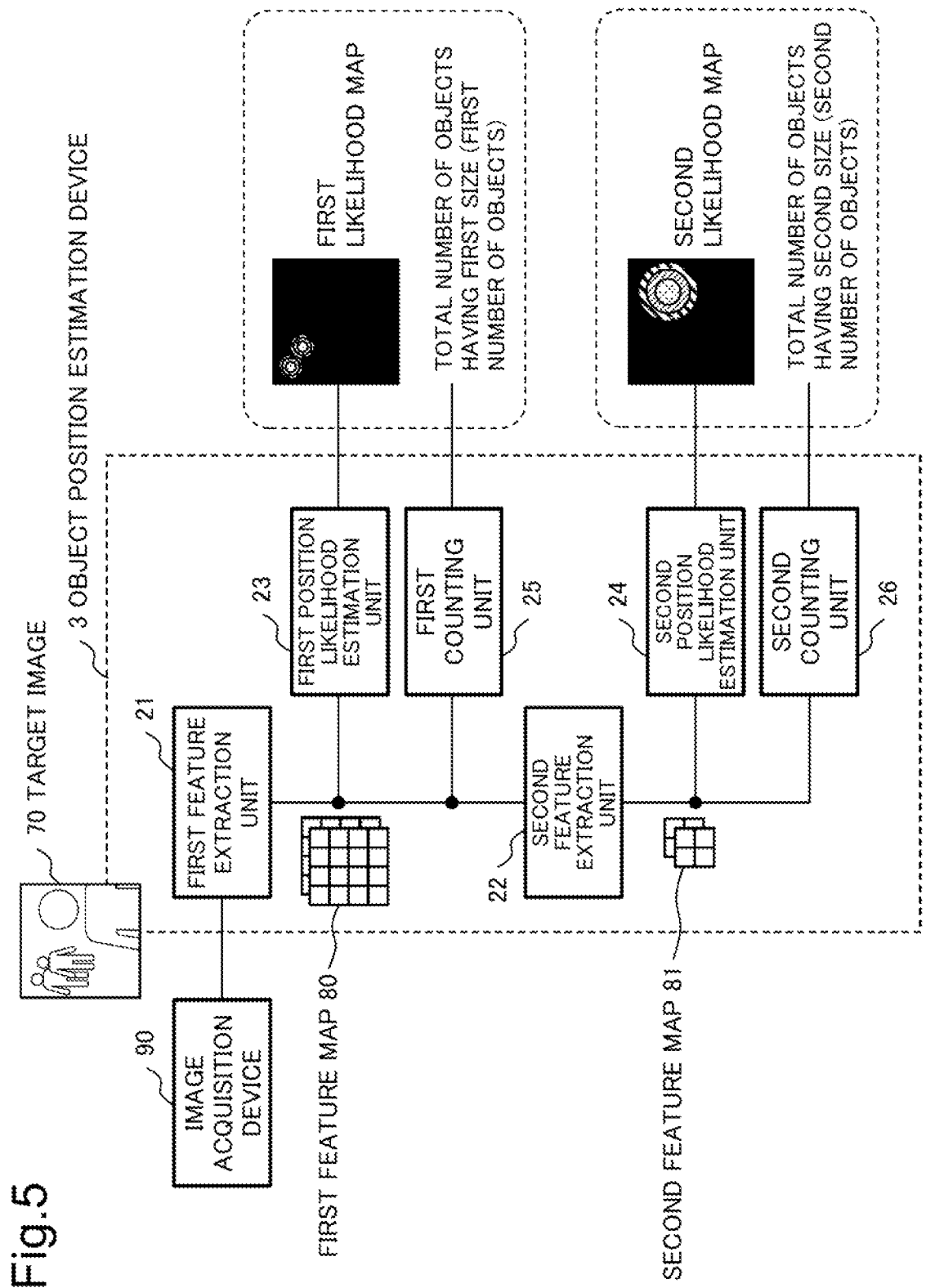
FIG. 5 is a block diagram illustrating a configuration of an object position estimation device according to Example Embodiment 3.

FIG. 5 is a block diagram illustrating a configuration of an object position estimation device 3 according to the present Example Embodiment 3. As illustrated in FIG. 5, the object position estimation device 3 includes a first feature extraction unit 21, a second feature extraction unit 22, a first position likelihood estimation unit 23, and a second position likelihood estimation unit 24. In addition, the object position estimation device 3 further includes a first counting unit 25 and a second counting unit 26. Similarly to the object position estimation device 2a according to the modification of Example Embodiment 2, the object position estimation device 3 according to a modification of the present Example Embodiment 3 may include three or more feature extraction units and three or more position likelihood estimation units. In that case, the counting units are added as many as the number of feature extraction units and position likelihood estimations. The first counting unit 25 and the second counting unit 26 are examples of a first counting means and a second counting means.

The first feature extraction unit 21 generates a first feature map 80 from the target image 70, and the second feature extraction unit 22 generates a second feature map 81 from the first feature map 80 generated by the first feature extraction unit 21.

Alternatively, the second feature extraction unit 22 may generate the second feature map from the target image 70 itself. In this case, the second feature extraction unit 22 acquires the target image 70 instead of the first feature map 80. The second feature extraction unit 22 generates the second feature map 81 by performing convolution processing on the target image 70 itself.

The first counting unit 25 acquires the first feature map 80 from the first feature extraction unit 21, and calculates the total number of objects having the first size in the target image 70 using the first feature map 80. Specifically, the first counting unit 25 is trained so as to be able to determine the feature of the object having the first size. The first counting unit 25 that has completed the training detects each object unit 25 having the first size in the target image 70 and counts the objects to calculate the total number of objects having the first size.

The second counting unit 26 acquires the second feature map 81 from the second feature extraction unit 22, and calculates the total number of objects having the second size in the target image 70 using the second feature map 81. Specifically, the second counting unit 26 is trained so as to be able to determine the feature of the object having the second size. The second counting unit 26 that has completed the training detects each object having the second size in the target image 70 and counts the objects to calculate the total number of objects having the second size. For example, the first counting unit 25/the second counting unit 26 is a convolutional neural network having trained parameters. Then, the first feature extraction unit 21, the second feature extraction unit 22, the first position likelihood estimation unit 23, the second position likelihood estimation unit 24, the first counting unit 25, and the second counting unit 26 may be configured as one neural network. An example of a training method of the first counting unit 25 and the second counting unit 26 will be described in a later example embodiment.

(Effects of Present Example Embodiment)

According to the configuration of the present example embodiment, the first feature extraction unit 21 generates the first feature map 80 indicating the feature of the object by performing convolution processing on the target image 70. The second feature extraction unit 22 further performs convolution processing on the first feature map 80 to generate the second feature map 81 indicating the feature of the object.

The first position likelihood estimation unit 23 estimates a first likelihood map indicating a probability that the object having the first size is present at each position of the target image 70 using the first feature map 80. Using the second feature map 81, the second position likelihood estimation unit 24 estimates a second likelihood map indicating a probability that the object having the second size larger than the first size is present at each position of the target image 70.

As described above, since the object position estimation device 3 estimates the position of the object having the first size and the position of the object having the second size using the first feature map 80 and the second feature map 81, the position of each object can be estimated robustly and with high accuracy even if the objects overlap each other in the target image 70.

Further, according to the configuration of the present example embodiment, the first counting unit 25 counts the objects having the first size in the target image 70 using the first feature map 80. The second counting unit 26 counts the objects having the second size in the target image 70 using the second feature map 81. As a result, the object position estimation device 3 can more accurately estimate the total number of objects of the first size/objects having the second size included in the target image 70.

Example Embodiment 4

Example Embodiment 4 will be described with reference to FIG. 6.
(Object Position Estimation Device 4)

Figure 6:
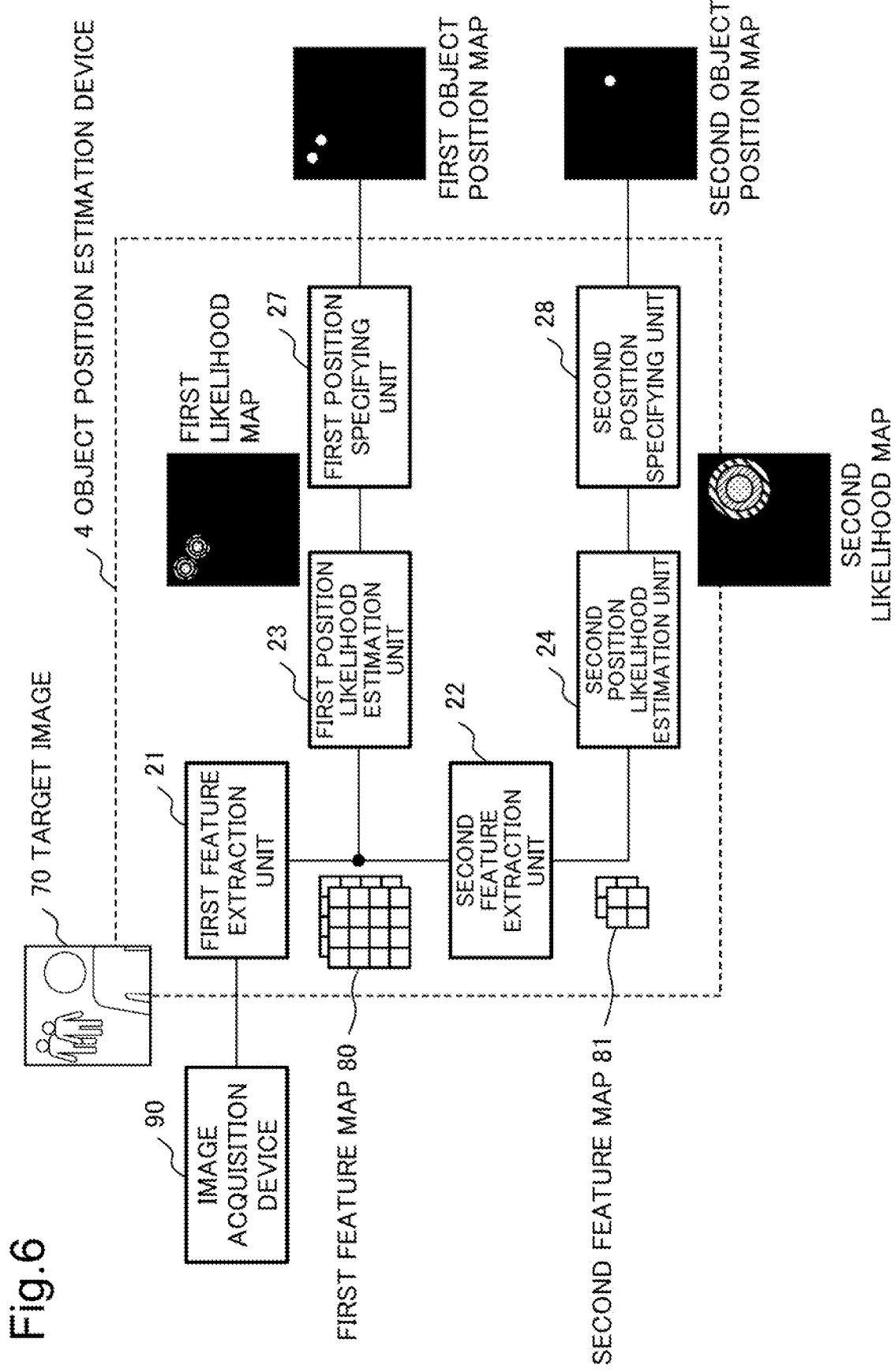
FIG. 6 is a block diagram illustrating a configuration of an object position estimation device according to Example Embodiment 4.

FIG. 6 is a block diagram illustrating a configuration of an object position estimation device 4 according to the present Example Embodiment 4. As illustrated in FIG. 6, the object position estimation device 4 includes a first feature extraction unit 21, a second feature extraction unit 22, a first position likelihood estimation unit 23, and a second position likelihood estimation unit 24. In addition, the object position estimation device 4 further includes a first position specifying unit 27 and a second position specifying unit 28. Similarly to the object position estimation device 2a according to the modification of Example Embodiment 2, the object position estimation device 4 according to the modification of the present Example Embodiment 4 may include three or more feature extraction units and three or more position likelihood estimation units. In that case, the position specifying units are added as many as the number of feature extraction units and position likelihood estimations. The first position specifying unit 27 and the second position specifying unit 28 are examples of a first position specifying means and a second position specifying means.

The first position specifying unit 27 specifies the position of the object having the first size in the target image 70 from the first likelihood map indicating the position of the object having the first size obtained from the first position likelihood estimation unit 23.

Specifically, the first position specifying unit 27 extracts coordinates indicating a local maximum value of the likelihood from the first likelihood map. After acquiring the coordinates indicating the local maximum value of the likelihood from the first likelihood map, the first position specifying unit 27 may integrate a plurality of coordinates indicating the local maximum value of the likelihood into one on the basis of a distance between the coordinates indicating the local maximum value of the likelihood or a Mahalanobis distance in which a spread of the likelihood around the coordinates indicating the local maximum value of the likelihood is a variance value.

For example, in a case where the Mahalanobis distance between the coordinates indicating the local maximum value of the likelihood is less than a threshold, the first position specifying unit 27 integrates these local maximum values. In this case, the first position specifying unit 27 may set the average value of the plurality of local maximum values as the integrated local maximum value. Alternatively, the first position specifying unit 27 may set an intermediate position of a plurality of coordinates indicating the local maximum value as the coordinate of the integrated local maximum value.

Thereafter, the first position specifying unit 27 calculates the total number (hereinafter, referred to as a first number of objects) of objects of the first size in the target image 70 by summing all the likelihoods in the first likelihood map.

When the first number of objects is not 0 in the target image 70, the first position specifying unit 27 further extracts the same number of coordinates as the first number of objects in the target image 70 in descending order of likelihood from among the coordinates indicating the local maximum value of the likelihood in the first likelihood map. As a result, even in a case where a large number of local maximum values caused by noise appear in the first likelihood map, the first position specifying unit 27 can exclude the local maximum value that is not relevant to the object having the first size. The first position specifying unit 27 generates the first object position map in a case where the one or more coordinates thus extracted correspond to the position of the object of the first size. The first position specifying unit 27 may output the coordinates themselves instead of the object position map. The first object position map indicates a position where the object having the first size is present in the target image 70.

The first position specifying unit 27 may further extract coordinates having a likelihood of a predetermined value or more from among the coordinates indicating the local maximum value of the likelihood extracted from the first likelihood map. As a result, the first position specifying unit 27 can exclude the local maximum value that is not relevant to the object having the first size. The first position specifying unit 27 specifies that an object of the first size is present at a position in the target image 70 associated to the coordinates extracted in this way.

Specifically, the second position specifying unit 28 specifies the position of the object having the second size in the target image 70 using the second likelihood map. For example, the second position specifying unit 28 extracts coordinates indicating the local maximum value of the likelihood from the second likelihood map. After acquiring the coordinates indicating the local maximum value of the likelihood from the second likelihood map, the second position specifying unit 28 may integrate a plurality of coordinates indicating the local maximum value of the likelihood into one on the basis of a distance between the coordinates indicating the local maximum value of the likelihood or a Mahalanobis distance in which a spread of the likelihood around the coordinates indicating the local maximum value of the likelihood is a variance value.

For example, in a case where the Mahalanobis distance between the coordinates indicating the local maximum value of the likelihood is less than a threshold, the second position specifying unit 28 integrates these local maximum values. In this case, the second position specifying unit 28 may set the average value of the plurality of local maximum values as the integrated local maximum value. Alternatively, the second position specifying unit 28 may set an intermediate position of a plurality of coordinates indicating the local maximum value as the coordinate of the integrated local maximum value.

Thereafter, the second position specifying unit 28 calculates the total number (hereinafter, referred to as a second number of objects) of objects of the second size in the target image 70 by summing all the likelihoods in the second likelihood map.

When the second number of objects is not 0 in the target image 70, the second position specifying unit 28 further extracts the same number of coordinates as the second number of objects in the target image 70 in descending order of likelihood from among the coordinates indicating the local maximum value of the likelihood in the second likelihood map. The second position specifying unit 28 generates the second object position map in a case where the one or more coordinates thus extracted correspond to the position of the object of the second size. The second position specifying unit 28 may output the coordinates themselves instead of the object position map. The second object position map indicates a position where the object having the second size is present in the target image 70.

The second position specifying unit 28 may further extract coordinates having a likelihood of a predetermined value or more from among the coordinates indicating the local maximum value of the likelihood extracted from the second likelihood map. As a result, the second position specifying unit 28 can exclude the local maximum value that is not relevant to the object having the second size. The second position specifying unit 28 specifies that an object of the second size is present at a position in the target image 70 associated to the coordinates extracted in this way.

The first position specifying unit 27/the second position specifying unit 28 may perform image processing such as blurring processing on the first likelihood map/the second likelihood map as preprocessing for generating the first object position map/the second object position map. As a result, noise can be removed from the first likelihood map/the second likelihood map. As post-processing of generating the first object position map/the second object position map, the first position specifying unit 27/the second position specifying unit 28 may integrate coordinates indicating the positions of the objects having the first size/the second size using, for example, a distance between coordinates indicating the positions of the objects having the first size/the second size or a Mahalanobis distance having, as a variance value, a spread of likelihood around coordinates indicating the positions of the objects having the first size/the second size.

The first position specifying unit 27/the second position specifying unit 28 may output coordinates indicating the positions of the objects having the first size/the second size estimated as described above by any method. For example, the first position specifying unit 27/the second position specifying unit 28 may cause a display device to display a map that presents coordinates indicating the position of the object, or may store data of coordinates indicating the position of the object in a storage device (not illustrated).

(Effects of Present Example Embodiment)

According to the configuration of the present example embodiment, the first feature extraction unit 21 generates the first feature map 80 indicating the feature of the object by performing convolution processing on the target image 70. The second feature extraction unit 22 further performs convolution processing on the first feature map 80 to generate the second feature map 81 indicating the feature of the object. The first position likelihood estimation unit 23 estimates a first likelihood map indicating a probability that the object having the first size is present at each position of the target image 70 using the first feature map 80. Using the second feature map 81, the second position likelihood estimation unit 24 estimates a second likelihood map indicating a probability that the object having the second size larger than the first size is present at each position of the target image 70.

As described above, since the object position estimation device 4 estimates the position of the object having the first size and the position of the object having the second size using the first feature map 80 and the second feature map 81, the position of each object can be estimated robustly and with high accuracy even if the objects overlap each other in the target image 70.

According to the configuration of the present example embodiment, the first likelihood map/the second likelihood map is converted into the first object position map/the second object position map indicating the determined position of the object. Then, as a result of estimating the position of the object, the first object position map/the second object position map or information based on the first object position map/the second object position map is output. As a result, the object position estimation device 4 can provide the information indicating the estimation result of the position of the object in a form that is easy for another device or another application to handle.

Example Embodiment 5

Example Embodiment 5 will be described with reference to FIG. 7.

(Object Position Estimation Device 5)

Figure 7:
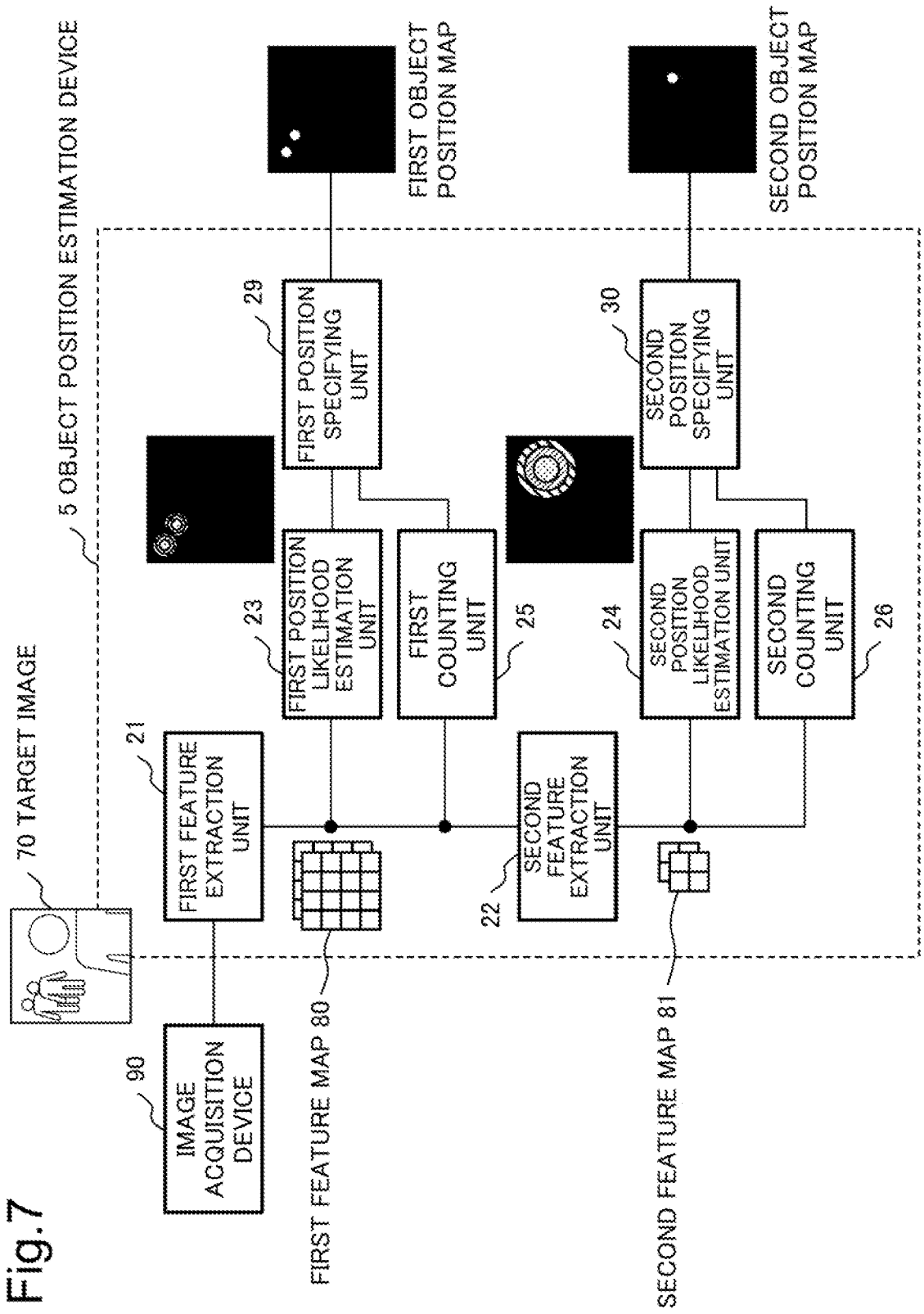
FIG. 7 is a block diagram illustrating a configuration of an object position estimation device according to Example Embodiment 5.

FIG. 7 is a block diagram illustrating a configuration of an object position estimation device 5 according to the present Example Embodiment 5. As illustrated in FIG. 7, similarly to Example Embodiment 3, the object position estimation device 5 includes a first feature extraction unit 21, a second feature extraction unit 22, a first position likelihood estimation unit 23, a second position likelihood estimation unit 24, a first counting unit 25, and a second counting unit 16. In addition, the object position estimation device 5 further includes a first position specifying unit 29 and a second position specifying unit 30. The object position estimation device 5 may include three or more feature extraction units, three or more position likelihood estimation units, and three or more counting units. In that case, the position specifying units are added as many as the number of feature extraction units, position likelihood estimations, and counting units.

The first position specifying unit 29 acquires the first likelihood map indicating the probability that the object having the first size is present from the first position likelihood estimation unit 23. The first position specifying unit 29 acquires the first number of objects, which is the total number of objects having the first size, from the first counting unit 25. The first position specifying unit 29 specifies coordinates indicating the local maximum value of the likelihood from the first likelihood map. The first position specifying unit 29 extracts the same number of coordinates as the total number of objects indicated by the first number of objects from among the coordinates indicating the local maximum value of the likelihood in the first likelihood map in descending order of likelihood. Then, the first position specifying unit 29 generates a first object position map indicating the position of the object of the first size.

The second position specifying unit 30 acquires the second likelihood map indicating the probability that the object having the second size is present from the second position likelihood estimation unit 24. The second position specifying unit 30 acquires the second number of objects, which is the total number of objects of the second size, from the second counting unit 26. The second position specifying unit 30 specifies coordinates indicating the local maximum value of the likelihood from the second likelihood map. The second position specifying unit 30 extracts the same number of coordinates as the total number of objects indicated by the second number of objects from among the coordinates indicating the local maximum value of the likelihood in the second likelihood map in descending order of likelihood. Then, the second position specifying unit 30 generates the second object position map in a case where the extracted coordinates correspond to the position of the object of the second size.

Alternatively, the first position specifying unit 29 and the second position specifying unit 30 may further have the functions of the first position specifying unit 27 and the second position specifying unit 28 described in Example Embodiment 4.

Specifically, the first likelihood map/the second likelihood map may include noise. Therefore, as preprocessing for generating the first object position map/the second object position map, the first position specifying unit 29/the second position specifying unit 30 may perform image processing such as blurring processing on each of the first likelihood map/the second likelihood map. As a result, noise included in the first likelihood map/second likelihood map can be made inconspicuous.

As post-processing, the first position specifying unit 29/the second position specifying unit 30 may acquire coordinates indicating the local maximum value of the likelihood from the first object position map/the second object position map, and then integrate a plurality of coordinates indicating the local maximum value of the likelihood into one on the basis of a distance between the coordinates indicating the local maximum value of the likelihood or a Mahalanobis distance having a spread of the likelihood around the coordinates indicating the local maximum value of the likelihood as a variance value.

For example, in a case where the Mahalanobis distance between the coordinates indicating the local maximum value of the likelihood is less than the threshold, the first position specifying unit 29/the second position specifying unit 30 integrates these local maximum values. In this case, the first position specifying unit 29/the second position specifying unit 30 may set the average value of the plurality of local maximum values as the integrated local maximum value. Alternatively, the first position specifying unit 29/the second position specifying unit 30 may set an intermediate position of a plurality of coordinates indicating the local maximum value as the coordinate of the integrated local maximum value.

The first position specifying unit 29/the second position specifying unit 30 may output the first object position map/the second object position map or information based on the first object position map or the second object position map by any method. For example, the first position specifying unit 29/the second position specifying unit 30 controls the display device to display the first object position map/the second object position map or information based on the first object position map/the second object position map on the display device. Alternatively, the first position specifying unit 29/the second position specifying unit 30 may store the first object position map/the second object position map in a storage device accessible from the object position estimation device 5. In addition, the first position specifying unit 29/the second position specifying unit 30 may transmit the first object position map/the second object position map or information based on the first object position map/the second object position map to another device accessible from the object position estimation device 5.

(Effects of Present Example Embodiment)

According to the configuration of the present example embodiment, the first feature extraction unit 21 generates the first feature map 80 indicating the feature of the object by performing convolution processing on the target image 70. The second feature extraction unit 22 further performs convolution processing on the first feature map 80 to generate the second feature map 81 indicating the feature of the object. The first position likelihood estimation unit 23 estimates a first likelihood map indicating a probability that the object having the first size is present at each position of the target image 70 using the first feature map 80. Using the second feature map 81, the second position likelihood estimation unit 24 estimates a second likelihood map indicating a probability that the object having the second size larger than the first size is present at each position of the target image 70.

As described above, since the object position estimation device 5 estimates the position of the object having the first size/the second size using the first feature map 80 and the second feature map 81, the position of each object can be estimated robustly and with high accuracy even if these objects overlap each other in the target image 70.

According to the configuration of the present example embodiment, the first position specifying unit 29/the second position specifying unit 30 converts the first likelihood map/the second likelihood map into the first object position map/the second object position map indicating the determined position of the object. Then, as a result of estimating the position of the object, the first object position map/the second object position map or information based on the first object position map/the second object position map is output. As a result, the object position estimation device 5 can provide the information indicating the estimation result of the position of the object in a form that is easy for another device or another application to handle.

Further, the first position specifying unit 29/the second position specifying unit 30 acquires the same number of coordinates as the total number of objects having the first size/the second size counted by the first counting unit 25 and the second counting unit 26 among the coordinates indicating the local maximum value of the likelihood in the likelihood map in descending order of likelihood. Therefore, even when a large number of local maximum values of the likelihood caused by noise appear on the first likelihood map/second likelihood map, the object position estimation device 5 can correctly acquire the coordinates of the object having the first size/the second size appearing in the target image 70.

Example Embodiment 6

Example Embodiment 6 will be described with reference to FIGS. 8 and 9.

(Object Position Estimation Device 6)

Figure 8:
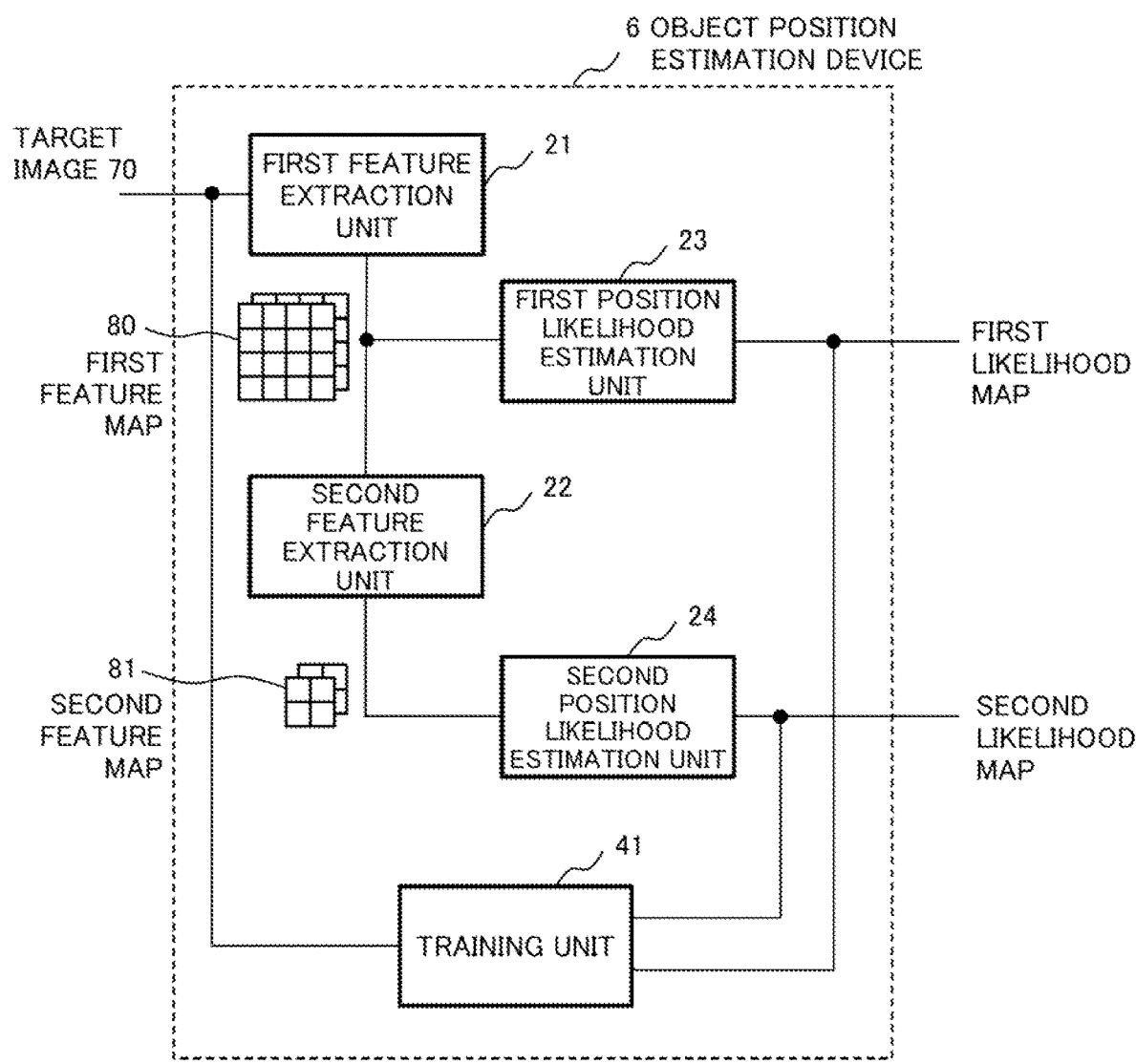
FIG. 8 is a block diagram illustrating a configuration of an object position estimation device according to Example Embodiment 6.

FIG. 8 is a block diagram illustrating a configuration of an object position estimation device 6 according to the present Example Embodiment 6. The object position estimation device 6 has a function equivalent to that of the object position estimation device 2 according to Example Embodiment 2 except for the points described below.

As illustrated in FIG. 8, the object position estimation device 6 according to the present Example Embodiment 6 includes a first feature extraction unit 21, a second feature extraction unit 22, a first position likelihood estimation unit 23, and a second position likelihood estimation unit 24. The object position estimation device 6 further includes a training unit 41. The training unit 41 is an example of a training means.

In a modification of the present Example Embodiment 6, the object position estimation device 6 may include three or more feature extraction units and three or more position likelihood estimation units. For example, the object position estimation device 6 is provided with n (>2) feature extraction units and n position likelihood estimation units. In this case, the training data (that is, teacher data) includes a training image, object information, and n correct likelihood maps from the first correct likelihood map to the n-th correct likelihood map. The n correct likelihood maps from the first correct likelihood map to the n-th correct likelihood map may be referred to as correct values.

(Learning unit 41)

The training unit 41 trains each unit (excluding the training unit 41) of the object position estimation device 6 by using training data (that is, teacher data) prepared in advance. The training data includes a training image, object information, a first correct likelihood map, and a second correct likelihood map.

The first correct likelihood map is a probability indicating the position of the object of the first size in the training image, and is determined on the basis of the object area. The second correct likelihood map is a probability indicating the position of the object of the second size in the training image, and is determined on the basis of the object area. A method for generating the first correct likelihood map and the second correct likelihood map is not limited. For example, the operator may visually observe the object area in the training image displayed on the display device and manually generate the first correct likelihood map and the second correct likelihood map. The object position estimation device 6 may further include a training data generation unit 42 illustrated in an object position estimation device 6a to be described later, and the training data generation unit 42 may generate the first correct likelihood map and the second correct likelihood map.

When the training data is generated by another device different from the object position estimation device 6, the object position estimation device 6 acquires the training data from the another device. For example, the training data is stored in advance in a storage device accessible from the object position estimation device 6. In this case, the object position estimation device 6 acquires training data from the storage device. Alternatively, the object position estimation device 6 may acquire the training data generated by the training data generation unit 42 (modification described later).

The object position estimation device 6 does not learn the feature of the shape of the object, but learns the position of the object in the training image in consideration of the overlap between the objects. As a result, the object position estimation device 6 can learn the overlap between the objects in the training image as it is.

The training unit 41 inputs the training image to the first feature extraction unit 21. The first feature extraction unit 21 generates the first feature map 80 from the training image. Then, the first position likelihood estimation unit 23 outputs the first likelihood map indicating the position of the object having the first size on the basis of the first feature map 80. The first position likelihood estimation unit 23 outputs the first likelihood map to the training unit 41.

The first feature extraction unit 21 inputs the first feature map 80 to the second feature extraction unit 22. The second feature extraction unit 22 generates the second feature map 81 from the first feature map 80.

Alternatively, the second feature extraction unit 22 may generate the second feature map from the training image itself. In this case, the second feature extraction unit 22 acquires a training image instead of the first feature map 80. The second feature extraction unit 22 generates the second feature map 81 by performing more convolution processing than the first feature extraction unit 21 on the training image itself.

The second position likelihood estimation unit 24 outputs the second likelihood map indicating the position of the object having the second size in the training image on the basis of the second feature map 81. The second position likelihood estimation unit 24 outputs the second likelihood map to the training unit 41.

The training unit 41 calculates an error between each output (first likelihood map, second likelihood map) from the first position likelihood estimation unit 23 and the second position likelihood estimation unit 24 and a correct value (first correct likelihood map, second correct likelihood map) included in the training data as a first loss. For example, the training unit 41 calculates a mean square error between the first likelihood map/second likelihood map and the first correct likelihood map/second correct likelihood map. Then, the training unit 41 sets the mean square error between the calculated maps as the first loss. The training unit 41 trains each unit (excluding the training unit 41) of the object position estimation device 6 so as to reduce the calculated first loss.

The term "training" as used herein means updating parameters of each unit of the object position estimation device 6. For example, the training unit 41 can execute training processing using a known technique such as back propagation. Specifically, the training unit 41 calculates the first loss using a preset calculation formula of the first loss (for example, a loss function), and trains each unit of the object position estimation device 6 to reduce the first loss. Alternatively, the training unit 41 acquires the calculation formula of the first loss stored in the accessible storage device, calculates the first loss, and trains each unit of the object position estimation device 6 so as to reduce the first loss.

In one example, the training unit 41 updates the parameter of each unit (excluding the training unit 41) of the object position estimation device 6 on the basis of the information (that is, the first likelihood map/the second likelihood map) fed back to the training unit 41 from the output of the first position likelihood estimation unit 23/the second position likelihood estimation unit 24.

After the parameters of each unit (excluding the training unit 41) of the object position estimation device 6 are updated, each unit of the object position estimation device 6 estimates and outputs the first likelihood map/the second likelihood map using another training data.

From the output of the first position likelihood estimation unit 23/the second position likelihood estimation unit 24, the first likelihood map/the second likelihood map is fed back to the training unit 41. The training unit 41 updates the parameters of each unit (excluding the training unit 41) of the object position estimation device 6 again on the basis of the fed back information (that is, the first likelihood map/the second likelihood map).

The training unit 41 may repeatedly perform training of each unit of the object position estimation device 6 by the method described above until the magnitude of the first loss becomes equal to or less than a predetermined threshold.

However, a condition for the training unit 41 to end the training of each unit (excluding the training unit 41) of the object position estimation device 6 is not limited. In this manner, the training unit 41 repeatedly trains the parameter of each unit of the object position estimation device 6 so as to reduce the first loss. As a result, since the estimation of the first likelihood map and the estimation of the second likelihood map are simultaneously trained through the first feature extraction unit 21, the object position estimation device 6 can estimate the position of the object more accurately, and the training speed can be improved.

(Operation of Object Position Estimation Device 6)

The operation of the object position estimation device 6 according to the present Example Embodiment 6 will be described with reference to FIG. 9. FIG. 9 is a flowchart illustrating a flow of operation of the object position estimation device 6. Here, a case where the object position estimation device 6 performs training using a single training data will be described. When there is a plurality of pieces of training data, the object position estimation device 6 repeats the processing from Steps S20 to S23 illustrated in FIG. 9 and executes the processing for each piece of training data.

Figure 9:
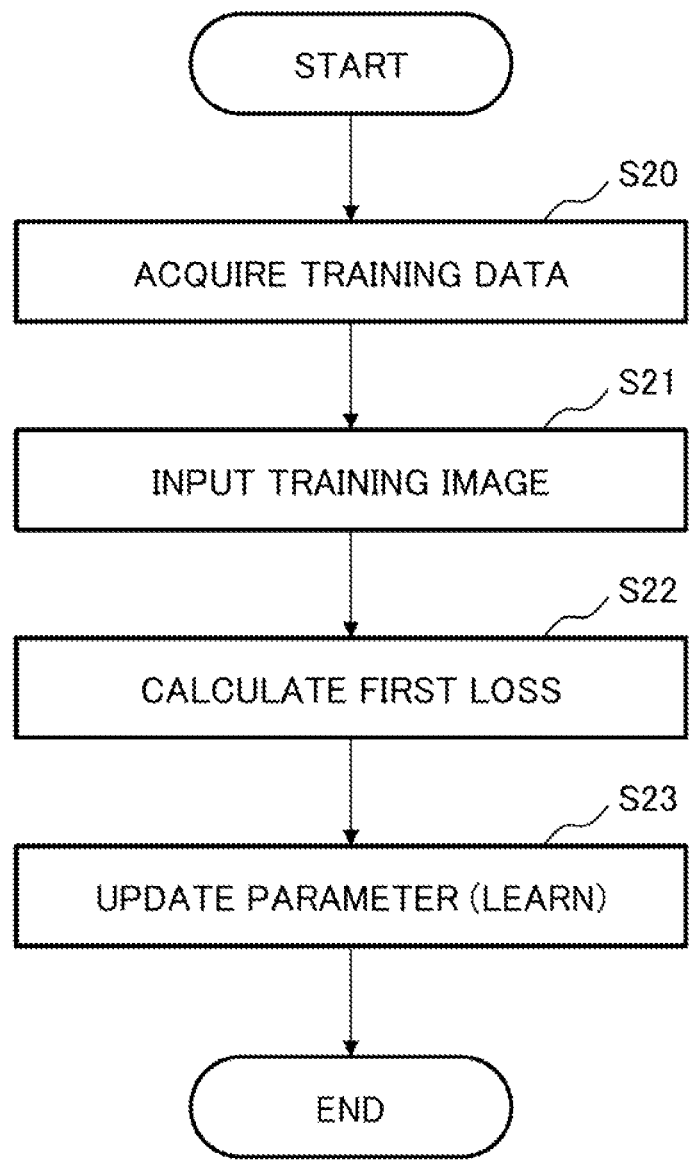
FIG. 9 is a flowchart illustrating a flow of processing executed by each unit of the object position estimation device according to Example Embodiment 6.

As illustrated in FIG. 9, first, the training unit 41 acquires training data (S20). The training unit 41 inputs the training image included in the training data to the first feature extraction unit 21 (S21). The training unit 41 calculates the first loss indicating an error between the output of each position likelihood estimation unit and the correct value (S22), and performs training (parameter update) of each unit of the object position estimation device 6 so as to reduce the calculated first loss (S23).

Thus, the operation of the object position estimation device 6 ends.

(Modification 1)

In Modification 1, the object information of the training data also indicates an attribute of the object in addition to the position and size of the object. The training unit 41 prepares, as the training data, a first correct likelihood map that is a probability indicating the position of the object of the first size and a second correct likelihood map that is a probability indicating the position of the object of the second size for each attribute of the object. Then, the training unit 41 executes training of each unit of the object position estimation device 6 by the above-described method (FIG. 9) using the training image, the first correct likelihood map that is a probability indicating the position of the object of the first size for each attribute, and the second correct likelihood map that is a probability indicating the position of the object of the second size for each attribute.

According to the configuration of Modification 1, training of each unit of the object position estimation device 6 is executed using the first correct likelihood map and the second correct likelihood map for each attribute. As a result, the object position estimation device 6 can estimate the position of the object for each attribute of the object. For example, the object position estimation device 6 can estimate the position of an adult (an example of the attribute of the object) and can also separately estimate the position of a child (another example of the position of the object).

(Modification 2)

In a case where the total number of objects in the training image is small or the deviation of the arrangement of the objects is large, there is a possibility that the training does not proceed correctly. Specifically, in the first correct likelihood map or the second correct likelihood map that is the training data, there may be many coordinates whose likelihood is 0.

In the training for minimizing the first loss described above, the training unit 41 according to the present Modification 2 trains each unit of the object position estimation device 6 so as to minimize errors in some coordinates instead of using errors in all coordinates in the first correct likelihood map/second correct likelihood map that is training data and the first likelihood map/second likelihood map that is an estimation result. Specifically, the training unit 41 according to the present Modification 2 selects some coordinates on the first correct likelihood map/the second correct likelihood map that is the training data such that the number of coordinates having a likelihood of 0 and the number of other coordinates become a predetermined ratio in the first correct likelihood map/the second correct likelihood map that is the training data. Then, according to the coordinates on the selected first correct likelihood map/second correct likelihood map, the coordinates of the first likelihood map/second likelihood map, which is the estimation result, are also selected. For example, the training unit 41 selects the same number of coordinates with the likelihood of 0 and the other coordinates from the first correct likelihood map/the second correct likelihood map, and also selects the coordinates of the first likelihood map/the second likelihood map according to the selected coordinates on the first correct likelihood map/the second correct likelihood map. The training unit 41 updates the parameters of each unit of the object position estimation device 6 so as to minimize the first error in the selected coordinate.

(Object Position Estimation Device 6a)

Figure 10:
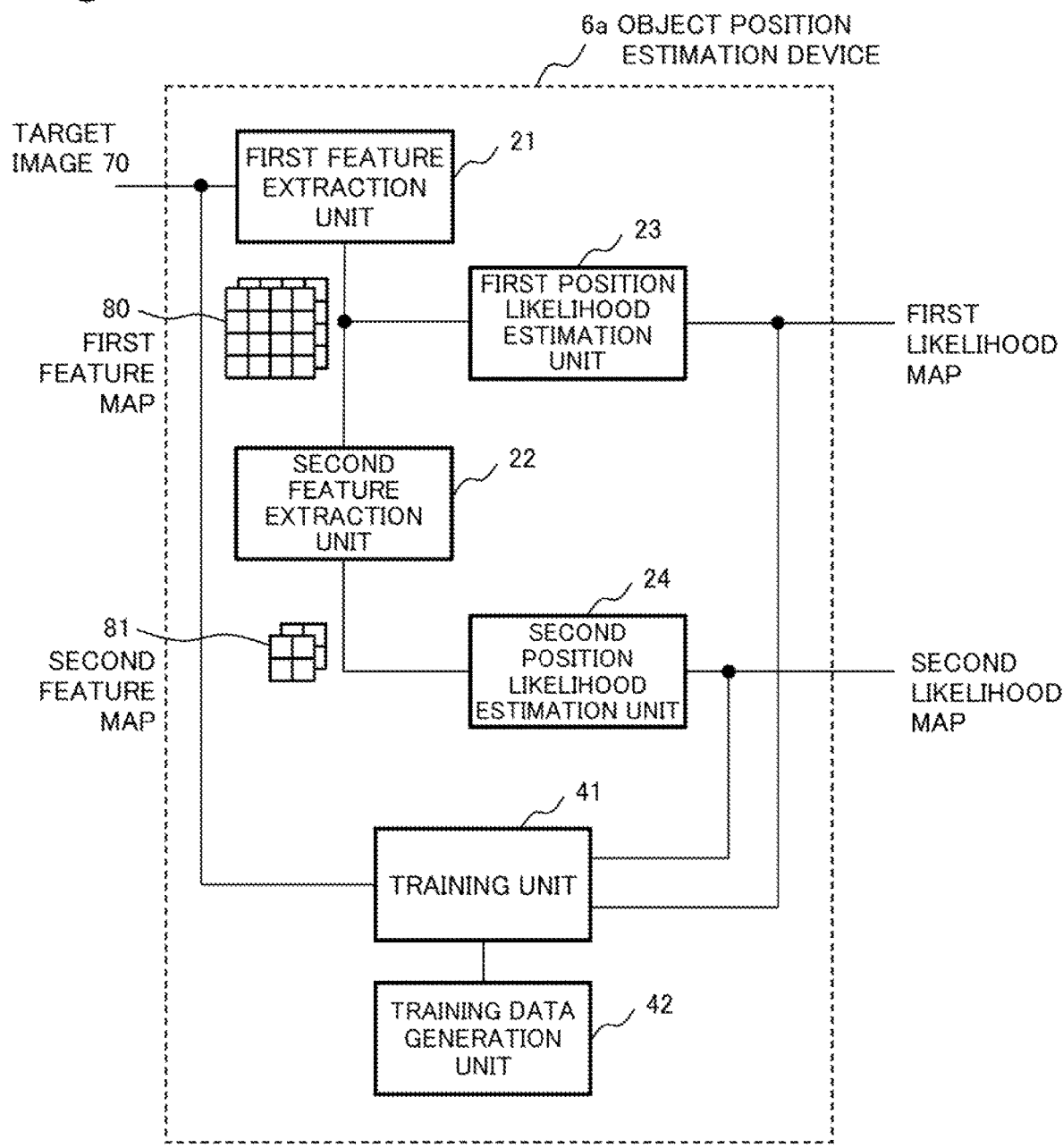
FIG. 10 is a block diagram illustrating a configuration of an object position estimation device according to a modification of Example Embodiment 6.

FIG. 10 is a block diagram illustrating a configuration of an object position estimation device 6a according to a modification of the present Example Embodiment 6. An object position estimation device 6a according to the present modification includes a first feature extraction unit 21, a second feature extraction unit 22, a first position likelihood estimation unit 23, and a second position likelihood estimation unit 24.

The object position estimation device 6a further includes a training unit 41 and a training data generation unit 42. The training data generation unit 42 is an example of a training data generation means. The object position estimation device 6a is different from the above-described object position estimation device 6 in that the object position estimation device 6a further includes the training data generation unit 42.

(Learning Data Generation Unit 42)

The training data generation unit 42 generates training data (teacher data) for the training unit 41 to perform training.

Figure 11:
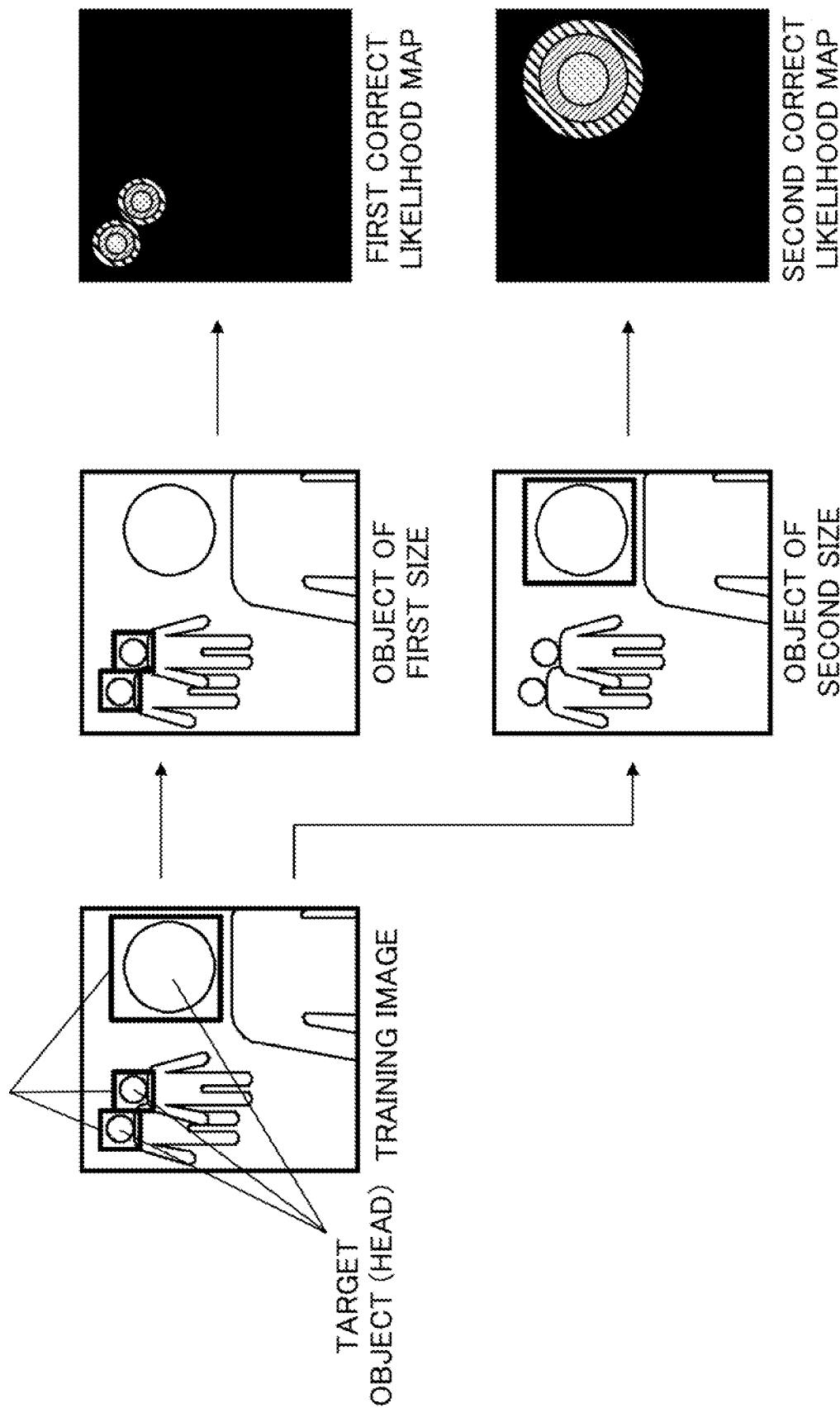
FIG. 11 is a diagram for explaining a flow of processing in which a training data generation means of an object position estimation device according to a modification of Example Embodiment 6 generates a first correct likelihood map/a second correct likelihood map.

The operation of the training data generation unit 42 according to the present modification will be described with reference to FIG. 11. FIG. 11 illustrates a flow of processing executed by the training data generation unit 42 to create the first correct likelihood map and the second correct likelihood map that are training data.

The training data generation unit 42 acquires a training image. For example, the training image and the object information are input to the object position estimation device 6a by the operator. Here, the training image includes the object having the first size/the object having the second size (the head that is the "target object" in FIG. 11) which is the target of the position estimation by the object position estimation device 6a. The object area in the training image is specified by the object information associated with the training image.

The object area corresponds to an area occupied by the object in the training image. For example, the object area is an area surrounded by a rectangle or another two-dimensional shape circumscribing the object in the training image. For example, the object information specifies coordinates of an upper left corner and a lower right corner of an object area (for example, a circumscribed rectangle of the object) in the training image.

The training data generation unit 42 specifies the position and size of the object in the training image by using the object information associated with the training image. Then, according to a procedure described below, the training data generation unit 42 generates the first correct likelihood map and the second correct likelihood map.

As illustrated in FIG. 11, the training data generation unit 42 first detects each of the object having the first size and the object having the second size on the basis of the object information associated with the training image. The training data generation unit 42 specifies the position of the object having the first size/the object having the second size in the training image.

Next, the training data generation unit 42 prepares an initial first correct likelihood map/an initial second correct likelihood map in which the likelihood of all coordinates is 0, and generates a normal distribution of the likelihood centered on the center or the centroid of the object area for the object having the first size/the object having the second size on the first correct likelihood map/second correct likelihood map. In generating the normal distribution of the likelihood, the training data generation unit 42 generates the normal distribution of the likelihood for the object having the first size on the first correct likelihood map, and generates the normal distribution of the likelihood for the object having the second size on the second correct likelihood map.

In addition, the training data generation unit 42 defines the spread of the normal distribution on the first correct likelihood map/the second correct likelihood map by parameters. For example, the parameter may be a parameter of a center (average) and a variance of a function indicating the normal distribution. In this case, the center of the function indicating the normal distribution may be a value indicating the position of the object (for example, the center or the centroid of the object area), and the variance of the function indicating the normal distribution may be a value relevant to the size of the object area. The form of the function indicating the normal distribution may be set such that the value of the center of the function indicating the normal distribution becomes 1.

As described above, the training data generation unit 42 generates the first correct likelihood map/the second correct likelihood map indicating the probability that the object having the first size/the object having the second size are present at each position of the training image. In the first correct likelihood map/the second correct likelihood map, the object area for the object having the first size/the object having the second size is related to the spread of the normal distribution of the likelihood.

In a case where normal distributions of a plurality of likelihoods overlap in a certain portion on the first correct likelihood map and the second correct likelihood map, the training data generation unit 42 may set the maximum value of the likelihood at the same coordinate in the portion as the likelihood at the coordinate. Alternatively, the training data generation unit 42 may set the average value of the likelihoods at coordinates of the portion where the plurality of normal distributions overlap as the likelihood at the coordinate. However, the training data generation unit 42 may calculate the likelihood in the portion where the plurality of normal distributions overlap on the first correct likelihood map and the second correct likelihood map by other methods.

The training data generation unit 42 counts the total number of objects having the first size (first number of objects) in the training image on the basis of the object information. The training data generation unit 42 normalizes the likelihood of the first correct likelihood map such that the sum of the likelihood in the first correct likelihood map coincides with the first number of objects in the training image. In FIG. 11, the normalized first correct likelihood map is omitted. Alternatively, the training data generation unit 42 may count the first number of objects by using the sum of the proportions of the object areas included in the training image.

The likelihood at each coordinate of the normalized first correct likelihood map represents the probability that the object having the first size is present at the position indicated by the coordinate. The sum of the likelihoods of the entire normalized first correct likelihood maps is equal to the total number of objects having the first size included in the training image. That is, the sum of the likelihood of the entire first correct likelihood map also has the meaning of the total number of objects present in the first correct likelihood map.

Further, the training data generation unit 42 makes the size of the normalized first correct likelihood map equal to the size of the first likelihood map that is the output of the first position likelihood estimation unit 23. In other words, the training data generation unit 42 converts the first correct likelihood map such that each coordinate on the normalized first correct likelihood map is associated to each position in the training image on a one-to-one basis. In the above description, the case where the training data generation unit 42 performs normalization has been described as an example, but normalization processing is not essential. That is, the training data generation unit 42 may not normalize the first correct likelihood map and the second correct likelihood map.

The training data generation unit 42 specifies an object having the second size from the training image using the object information. The training data generation unit 42 generates a normal distribution representing the position of the object having the specified second size. Then, similarly to the procedure described with respect to the first correct likelihood map, the training data generation unit 42 generates the second correct likelihood map and normalizes the second correct likelihood map. In FIG. 11, the normalized second correct likelihood map is omitted.

Further, the training data generation unit 42 matches the size of the normalized second correct likelihood map with the size of the second likelihood map. That is, the training data generation unit 42 converts the second correct likelihood map such that each coordinate on the normalized second correct likelihood map is associated to each position in the training image on a one-to-one basis. The likelihood at each coordinate on the second correct likelihood map indicates a probability that an object having the second size is present at a relevant position on the training image. In the above description, the case where the training data generation unit 42 performs normalization has been described as an example, but normalization processing is not essential. That is, the training data generation unit 42 may not normalize the first correct likelihood map and the second correct likelihood map.

The training data generation unit 42 associates the training image, the object information, and the correct value. The correct value includes the first correct likelihood map and the second correct likelihood map.

(Effects of Present Example Embodiment)

According to the configuration of the present example embodiment, the first feature extraction unit 21 generates the first feature map 80 indicating the feature of the object by performing convolution processing on the target image 70. The second feature extraction unit 22 further performs convolution processing on the first feature map 80 to generate the second feature map 81 indicating the feature of the object. The first position likelihood estimation unit 23 estimates a first likelihood map indicating a probability that the object having the first size is present at each position of the target image 70 using the first feature map 80. Using the second feature map 81, the second position likelihood estimation unit 24 estimates a second likelihood map indicating a probability that the object having the second size larger than the first size is present at each position of the target image 70.

As described above, since the object position estimation device 6 (6a) estimates the position of the object having the first size/the object having the second size using the first feature map 80 and the second feature map 81, the position of each object can be estimated robustly and with high accuracy even if these objects overlap each other in the target image 70.

The object position estimation device 6 (6a) learns the position of the object having the first size/the object having the second size as the arrangement pattern of the objects including the overlap between the objects using the first correct likelihood map/the second correct likelihood map. In the first correct likelihood map/the second correct likelihood map, the probability that the object having the first size/the object having the second size are present in each coordinate of the training image is represented by likelihood. As a result, even in a case where objects overlap each other in the target image 70, the object position estimation device 6 (6a) can estimate the positions of the objects in the target image 70 robustly and with high accuracy.

Example Embodiment 7

Example Embodiment 7 will be described in detail with reference to FIGS. 12 and 13.

(Object Position Estimation Device 7)

Figure 12:
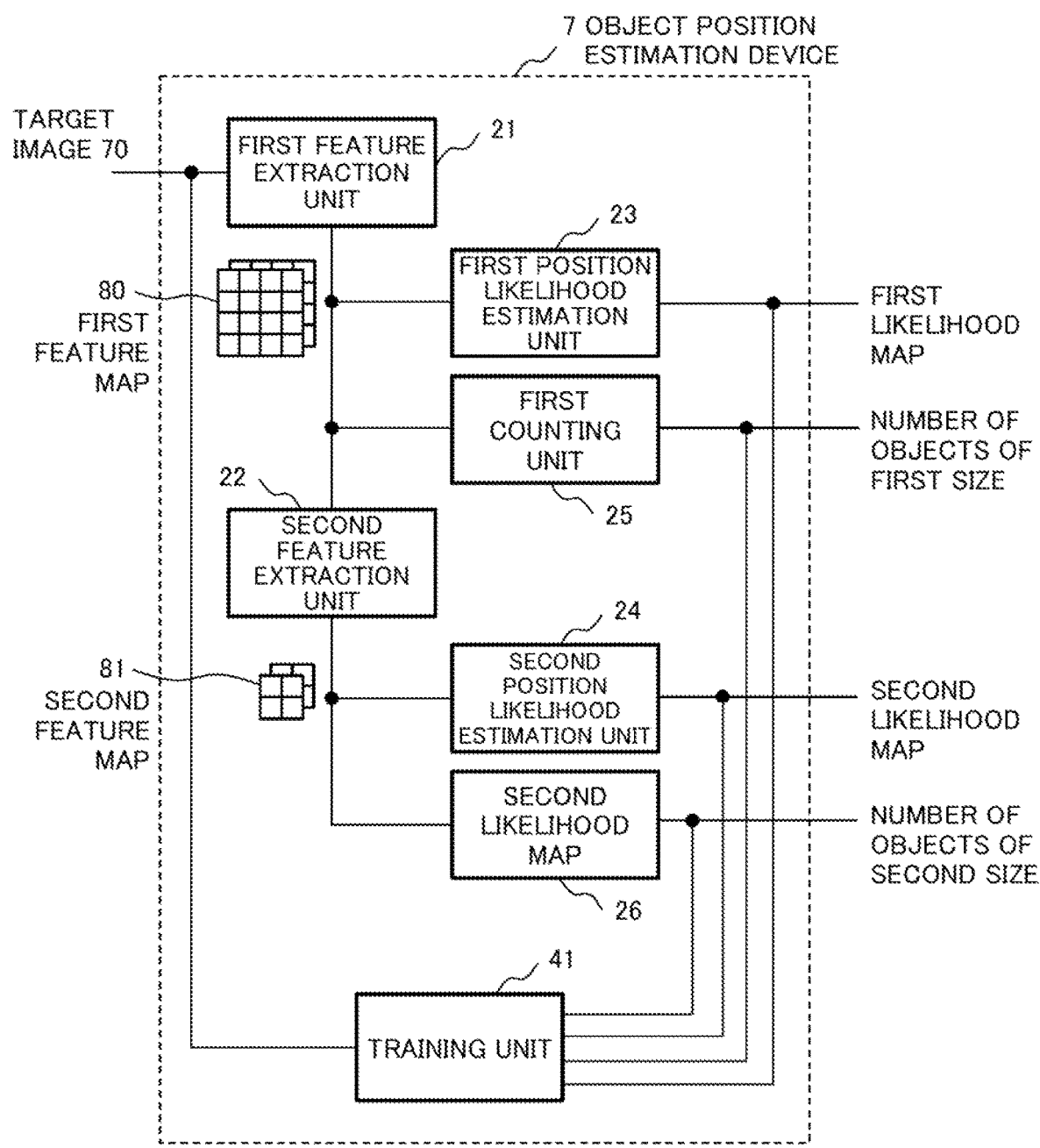
FIG. 12 is a block diagram illustrating a configuration of an object position estimation device according to Example Embodiment 7.

FIG. 12 is a block diagram illustrating a configuration of an object position estimation device 7 according to the present Example Embodiment 7. As illustrated in FIG. 12, the object position estimation device 7 includes a first feature extraction unit 21, a second feature extraction unit 22, a first position likelihood estimation unit 23, and a second position likelihood estimation unit 24. The object position estimation device 7 includes a training unit 41. In addition, the object position estimation device 7 further includes a first counting unit 25 and a second counting unit 26. For example, each unit of the object position estimation device 7 is enabled to function in a neural network such as a convolutional neural network individually or integrally.

(Learning Unit 41)

The training unit 41 trains each unit (excluding the training unit 41) included in the object position estimation device 7 by using training data prepared in advance (that is, teacher data).

In the present Example Embodiment 7, the training data includes a training image and object information. The training image includes an object for which the position likelihood is estimated. The training unit 41 uses the training image to learn estimation of the likelihood of the position of the object and the total number of objects. The training data further includes a correct value of the first number of objects, a correct value of the second number of objects, a first correct likelihood map, and a second correct likelihood map. Hereinafter, the first correct likelihood map, the second correct likelihood map, the correct value of the first number of objects, and the correct value of the second number of objects may be collectively referred to as correct values. These pieces of training data are used to cause each unit (excluding the training unit 41) of the object position estimation device 7 to learn that the training unit 41 estimates the likelihood of the position of the object and the total number of objects. The method of generating the correct value is not limited.

For example, the operator specifies the positions of the object having the first size/the object having the second size in the training image, and gives a normal distribution of the likelihood centered on the positions of the objects having the first size/the second size on the initial first correct likelihood map/second correct likelihood map in which the likelihood of all the coordinates is zero. The operator counts each of the objects having the first size and the objects having the second size appearing in the training image, and determines the total number of the objects having the first size appearing in the training image as the correct value of the first number of objects, and determines the total number of the objects having the second size appearing in the training image as the correct value of the second number of objects.

The likelihood in each coordinate of the first correct likelihood map indicates the probability that the object of the first size is present at the relevant position in the training image. The likelihood in each coordinate of the second correct likelihood map indicates the probability that the object of the second size is present at the relevant position in the training image.

The correct value of the first number of objects indicates the total number of objects having the first size included in the training image. The correct value of the second number of objects indicates the total number of objects having the second size included in the training image. In addition, the object position estimation device 7 may include a training data generation unit 42 illustrated in an object position estimation device 7a to be described later, and the training data generation unit 42 may generate each correct value.

The training unit 41 inputs the training image to the first feature extraction unit 21, and calculates an error between the first likelihood map/second likelihood map output from the first position likelihood estimation unit 23 and the second position likelihood estimation unit 24 and the correct value included in the training data (first correct likelihood map/second correct likelihood map) as a first loss. The training unit 41 calculates, as a second loss, an error between the number of first objects/the number of second objects output from the first counting unit 25 and the second counting unit 26 when the training image is input to the first feature extraction unit 21 and another correct value (correct value of the first number of objects and correct value of the second number of objects) included in the training data.

The training unit 41 causes each unit of the object position estimation device 7 to learn so as to reduce at least one of the first loss and the second loss.

Specifically, the training unit 41 updates the parameters of each unit (excluding the training unit 41) of the object position estimation device 7 on the basis of at least one of the first loss and the second loss. In one example, the training unit 41 causes each unit of the object position estimation device 7 to learn so that the first likelihood map output by the first position likelihood estimation unit 23 matches the first correct likelihood map. At the same time, the training unit 41 causes each unit of the object position estimation device 7 to learn so that the second likelihood map output by the second position likelihood estimation unit 24 matches the second correct likelihood map.

Further, the training unit 41 causes each unit of the object position estimation device 7 to learn so that the first number of objects counted by the first counting unit 25 matches the correct value of the first number of objects. In addition, the training unit 41 causes each unit of the object position estimation device 7 to learn so that the second number of objects counted by the second counting unit 26 matches the correct value of the second number of objects.

There may be a case where the deviation of the arrangement of the objects in the training image is large. In such a case, the training unit 41 may cause each unit of the object position estimation device 7 to learn so as to minimize an error only in some coordinates in the first likelihood map/the second likelihood map. The example described here is illustrated in Modification 2 of the object position estimation device 6.

(Object Position Estimation Device 7a)

Figure 13:
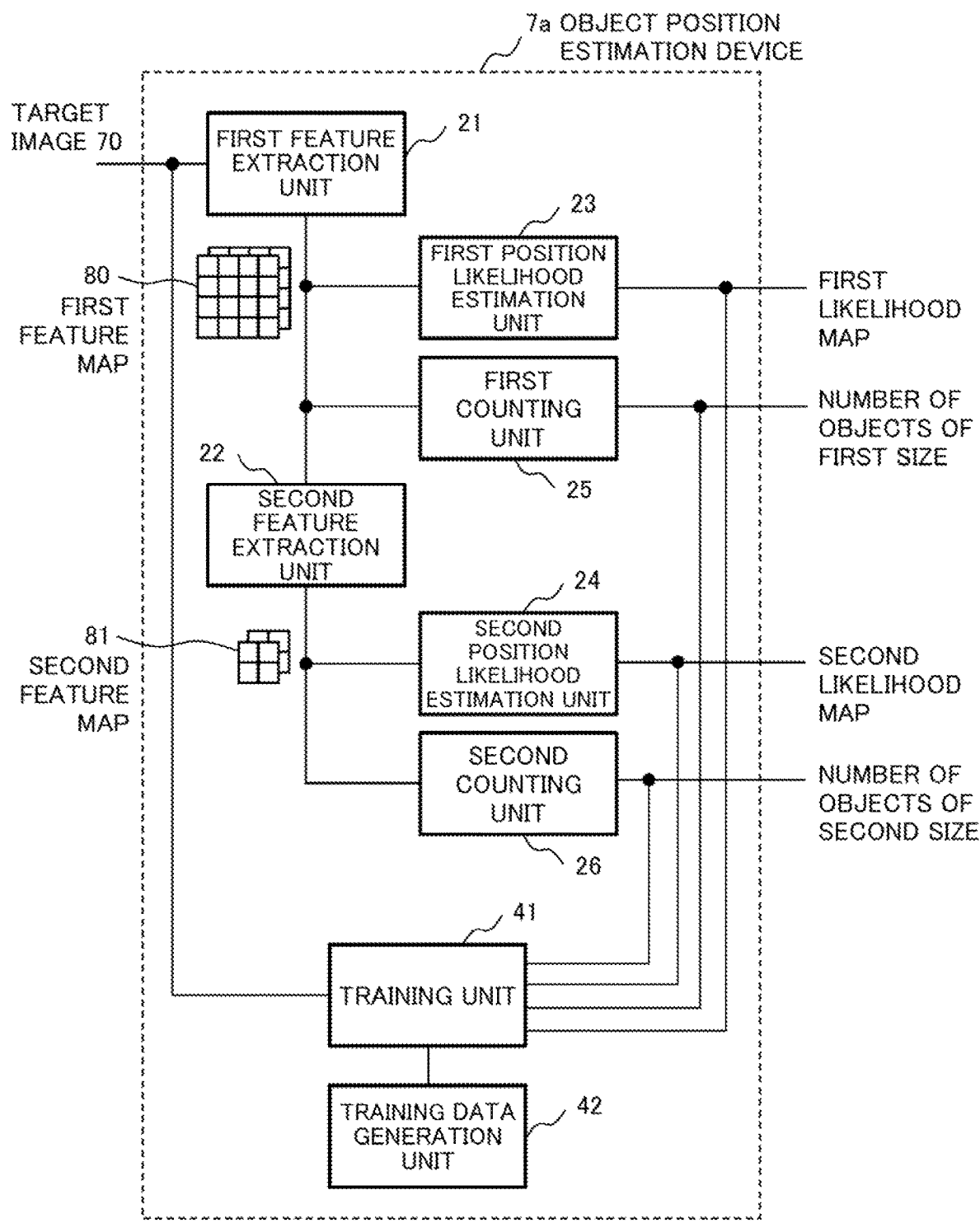
FIG. 13 is a block diagram illustrating a configuration of an object position estimation device according to a modification of Example Embodiment 7.

FIG. 13 is a block diagram illustrating a configuration of an object position estimation device 7a according to a modification of the present Example Embodiment 7. The object position estimation device 7a according to the present modification includes a first feature extraction unit 21, a second feature extraction unit 22, a first position likelihood estimation unit 23, a second position likelihood estimation unit 24, a first counting unit 25, a second counting unit 26, and a training unit 41. The object position estimation device 7a further includes a training data generation unit 42. The object position estimation device 7a according to the present modification is different from the object position estimation device 7 in that the object position estimation device 7a further includes the training data generation unit 42.

As in Example Embodiment 6 described above, the training data generation unit 42 generates training data (teacher data) for performing training relating to the estimation of the position of the object having the first size/the position of the object having the second size in the target image 70. The training data generated by the training data generation unit 42 includes a training image, object information, and a correct value.

The training data generation unit 42 according to the present modification generates training data including the correct value of the first number of objects and the correct value of the second number of objects as correct values. In this respect, the training data generation unit 42 of the object position estimation device 7a is different from the training data generation unit 42 of the object position estimation device 6a. The training data generation unit 42 of the object position estimation device 7a generates the correct value of the first number of objects and the correct value of the second number of objects using the total number of objects having the first size and the total number of objects having the second size obtained in the processing of the training data generation unit 42 of the object position estimation device 6a according to the modification of Example Embodiment 6. The total number of objects having the first size and the total number of objects having the second size are obtained by the count processing for normalizing the first correct likelihood map and the second correct likelihood map as described for the training data generation unit 42 of the object position estimation device 6a according to the modification of Example Embodiment 6.

(Effects of Present Example Embodiment)

According to the configuration of the present example embodiment, the object position estimation device 7 according to the present Example Embodiment 7 and the object position estimation device 7a according to the modification of the Example Embodiment 7 are configured such that a plurality of parts are simultaneously connected to the subsequent stage in the first feature extraction unit 21 and the second feature extraction unit 22, respectively, and in the training, the first feature extraction unit 21 and the second feature extraction unit 22 are affected by the plurality of parts to appropriately update the parameters. Further, the first feature extraction unit 21 and the second feature extraction unit 22 function as a common part of a plurality of parts connected at a subsequent stage, and the first feature extraction unit 21 and the second feature extraction unit 22 are simultaneously trained. As a result, the accuracy of estimating the position of the object and the accuracy of counting the objects in the object position estimation devices 7 and 7a can be improved, and the training speed can be improved.

[Hardware Configuration]

Figure 14:
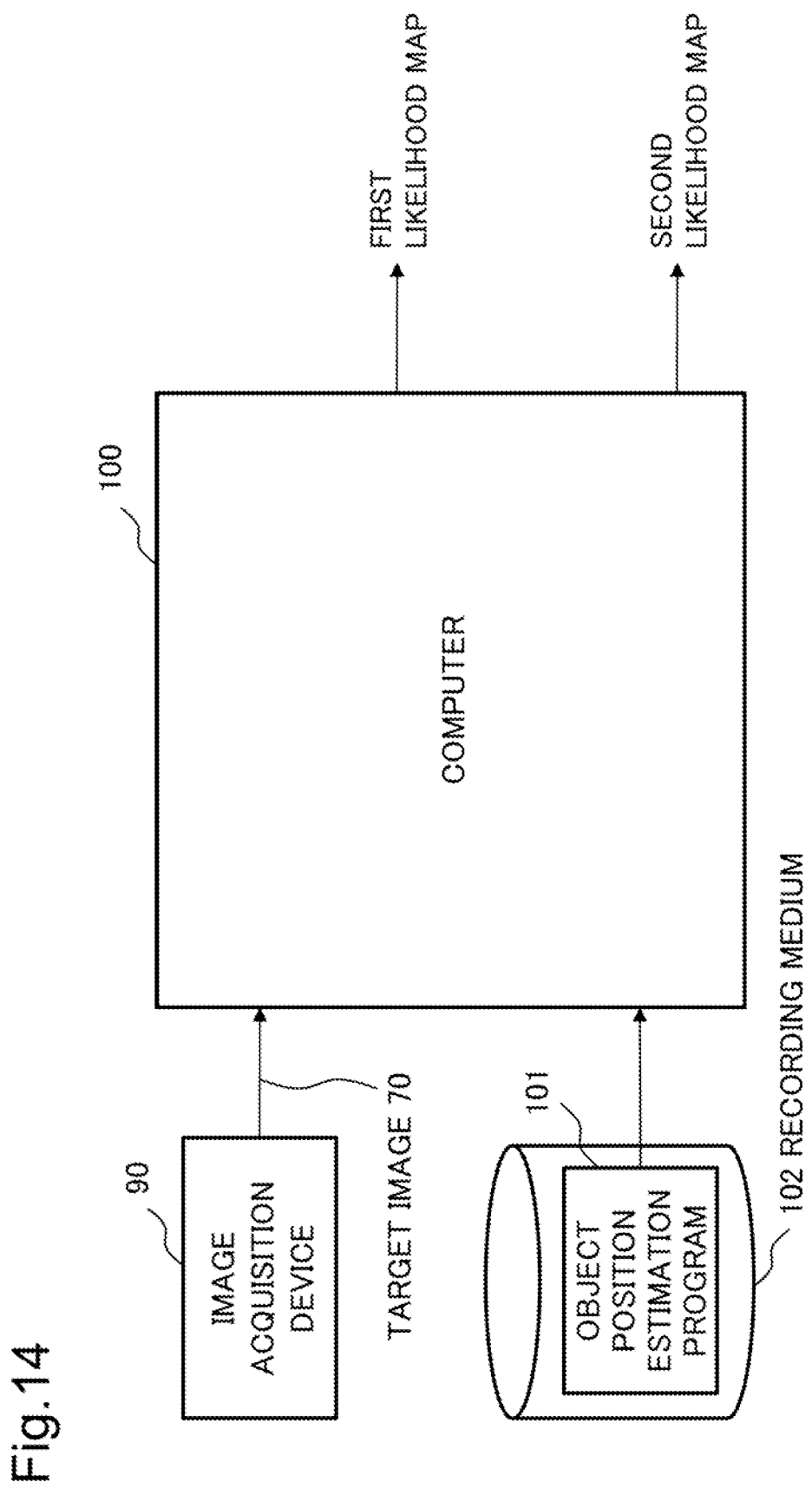
FIG. 14 is a diagram illustrating a hardware configuration of the object position estimation device according to any one of Example Embodiments 1 to 7.

FIG. 14 illustrates a hardware configuration of the object position estimation device 1 according to Example Embodiment 1. Each configuration of the object position estimation device 1 is implemented as a function in which a computer 100 reads and executes an object position estimation program 101 (hereinafter, the program is simply referred to as a program 101). Referring to FIG. 14, an image acquisition device 90 is connected to the computer 100. A recording medium 102 storing the program 101 readable by the computer 100 is connected to the computer 100.

The recording medium 102 includes a magnetic disk, a semiconductor memory, or the like. The computer 100 reads the program 101 stored in the recording medium 102 at the time of activation, for example. The program 101 controls the operation of the computer 100 to cause the computer 100 to function as each unit in the object position estimation device 1 according to Example Embodiment 1 of the present invention described above.

Here, the configuration in which the object position estimation device 1 according to Example Embodiment 1 is implemented by the computer 100 and the program 101 has been described. However, the object position estimation devices 2 to 7 (7a) according to Example Embodiments 2 to 7 can also be implemented by the computer 100 and the program 101.

[Supplementary Notes]

While the example embodiments of the present invention have been described above with reference to the drawings, these are examples of the present invention, and it is also possible to adopt a configuration in which the configurations of the example embodiments are combined or various configurations other than the above. Some or all of the above example embodiments may be described as the following Supplementary Notes, but are not limited to the following.

(Supplementary Note 1)

An object position estimation device including:

a feature extraction means including a first feature extraction means configured to generate a first feature map by performing convolution processing on a target image, and a second feature extraction means configured to generate a second feature map by further performing convolution processing on the first feature map; and a likelihood map estimation means including a first position likelihood estimation means configured to estimate, by using the first feature map, a first likelihood map indicating a probability that an object having a first size is present at each position of the target image, and a second position likelihood estimation means configured to estimate, by using the second feature map, a second likelihood map indicating a probability that an object having a second size larger than the first size is present at each position of the target image.

(Supplementary Note 2)

The object position estimation device according to Supplementary Note 1, in which each coordinate on the first likelihood map corresponds to one position on the target image, and a likelihood at each coordinate on the first likelihood map indicates a probability that the object having the first size is present at the corresponding one position on the target image, or indicates a number of objects having the first size that are additionally present on the target image, and each coordinate on the second likelihood map corresponds to one position on the target image, and a likelihood at each coordinate on the second likelihood map indicates a probability that the object having the second size is present at the corresponding one position on the target image, or indicates a number of objects having the second size that are additionally present on the target image.

(Supplementary Note 3)

The object position estimation device according to Supplementary Note 1 or 2, in which the first position likelihood estimation means is configured to estimate a position of the object having the first size for each attribute of the object of the first size, and the second position likelihood estimation means is configured to estimate a position of the object having the second size for each attribute of the object having the second size.

(Supplementary Note 4)

The object position estimation device according to any one of Supplementary Notes 1 to 3, further including:

a first counting means configured to count a total number of objects having the first size in the target image based on the first feature map; and a second counting means configured to count a total number of objects having the second size in the target image based on the second feature map.

(Supplementary Note 5)

The object position estimation device according to any one of Supplementary Notes 1 to 4, further including:

a first position specifying means configured to specify positions of objects having the first size in the target image based on coordinates indicating a local maximum value of likelihood in the first likelihood map; and a second position specifying means configured to specify positions of objects having the second size in the target image based on coordinates indicating a local maximum value of likelihood in the second likelihood map.

(Supplementary Note 6)

The object position estimation device according to Supplementary Note 5, in which the first position specifying means is configured to calculate a total number of objects having the first size in the target image from a sum of entire likelihood of the first likelihood map, or count a total number of objects having the first size in the target image from the first counting means, extract a same number of coordinates as the total number of objects having the first size from among coordinates indicating the local maximum value of the likelihood in the first likelihood map, in descending order of the local maximum value of the likelihood, and specify a position of the object having the first size in the target image based on the extracted coordinates indicating the local maximum value of the likelihood, and the second position specifying means is configured to calculate a total number of objects having the second size in the target image from a sum of entire likelihood of the second likelihood map, or count a total number of objects having the first size in the target image from the second counting means, extract a same number of coordinates as the total number of objects having the second size from among the coordinates indicating the local maximum value of the likelihood in the second likelihood map, in descending order of the local maximum value of the likelihood, and specify a position of the object having the second size in the target image based on the extracted coordinates indicating the local maximum value of the likelihood.

(Supplementary Note 7)

The object position estimation device according to any one of Supplementary Notes 1 to 6, further including a training means configured to cause each unit of the object position estimation device to perform training in such a way as to reduce an error with respect to a correct value obtained in advance in the first likelihood map and the second likelihood map output from the first position likelihood estimation means and the second position likelihood estimation means.

(Supplementary Note 8)

The object position estimation device according to Supplementary Note 7, further including a training data generation means configured to generate training data to be used for training by the training means based on a training image and object information, in which the training data includes the training image, the object information, and the correct value, the correct value includes a first correct likelihood map and a second correct likelihood map, and the first correct likelihood map indicates a position and a spread of an object area for the object of the first size in the training image, and the second correct likelihood map indicates a position and a spread of an object area for the object of the second size in the training image.

(Supplementary Note 9)

The object position estimation device according to Supplementary Note 8, in which the training means is configured to calculate a first loss indicating an error between the first likelihood map and the second likelihood map with respect to the correct value by using the first correct likelihood map and the second correct likelihood map included in the training data as the correct value.

(Supplementary Note 10)

The object position estimation device according to any one of Supplementary Notes 1 to 9, in which the first size is any size within a first predetermined range from a first minimum size to a first maximum size, the second size is any size within a second predetermined range from a second minimum size to a second maximum size, the first predetermined range and the second predetermined range do not overlap, and the second size is larger than the first size.

(Supplementary Note 11)

The object position estimation device according to any one of Supplementary Notes 1 to 10, in which the first size and the second size are proportional to reciprocals of data sizes of the first feature map and the second feature map.

(Supplementary Note 12)

An object position estimation method including:

generating a first feature map by performing convolution processing on a target image, and generating a second feature map by further performing convolution processing on the first feature map; and estimating a first likelihood map indicating a probability that an object having a first size is present at each position of the target image using the first feature map, and estimating a second likelihood map indicating a probability that an object having a second size larger than the first size is present at each position of the target image using the second feature map.

(Supplementary Note 13)

A non-transitory recording medium for causing a computer to execute:

generating a first feature map by performing convolution processing on a target image, and generating a second feature map by further performing convolution processing on the first feature map; and estimating a first likelihood map indicating a probability that an object having a first size is present at each position of the target image using the first feature map, and estimating a second likelihood map indicating a probability that an object having a second size larger than the first size is present at each position of the target image using the second feature map.

INDUSTRIAL APPLICABILITY

The present invention can be used in a video monitoring system for the purpose of, for example, discovering a suspicious person or a suspicious object from a captured or recorded video, or detecting a suspicious behavior or state. The present invention can be applied to applications in marketing such as traffic line analysis or behavior analysis. In addition, the present invention can be applied to an application such as a user interface for estimating positions of objects from a captured or recorded image and inputting position information of an estimated two-dimensional space or three-dimensional space. In addition, the present invention can also be applied to a video/video search device or a video search function using an estimation result of positions of objects and the position as a trigger key.

REFERENCE SIGNS LIST 1 object position estimation device
2 (2a) object position estimation device
3 object position estimation device
4 object position estimation device
5 object position estimation device
6 (6a) object position estimation device
7 object position estimation device
10 feature extraction unit
20 likelihood map estimation unit
21 first feature extraction unit
22 second feature extraction unit
23 first position likelihood estimation unit
24 second position likelihood estimation unit
25 first counting unit
26 second counting unit
27 first position specifying unit
28 second position specifying unit
29 first position specifying unit
30 second position specifying unit
41 training unit
42 training data generation unit
80 first feature map
81 second feature map
90 image acquisition unit

What is claimed is:

1. An object position estimation device comprising:
a memory configured to store instructions; and
at least one processor configured to execute the instructions to perform:
generating a first feature map by performing convolution processing on a target image, and generating a second feature map by further performing convolution processing on the first feature map;
estimating, by using the first feature map, a first likelihood map indicating a probability that an object having a first size is present at each position of the target image;
estimating, by using the second feature map, a second likelihood map indicating a probability that an object having a second size larger than the first size is present at each position of the target image;
specifying positions of objects having the first size in the target image based on coordinates indicating a local maximum value of likelihood in the first likelihood map;
specifying positions of objects having the second size in the target image based on coordinates indicating a local maximum value of likelihood in the second likelihood map;
calculating a total number of objects having the first size in the target image from a sum of entire likelihood of the first likelihood map, or count a total number of objects having the first size in the target image;
extracting a same number of coordinates as the total number of objects having the first size from among coordinates indicating the local maximum value of the likelihood in the first likelihood map, in descending order of the local maximum value of the likelihood,
specifying a position of the object having the first size in the target image based on the extracted coordinates indicating the local maximum value of the likelihood,
calculating a total number of objects having the second size in the target image from a sum of entire likelihood of the second likelihood map, or count a total number of objects having the second size in the target image,
extracting a same number of coordinates as the total number of objects having the second size from among the coordinates indicating the local maximum value of the likelihood in the second likelihood map, in descending order of the local maximum value of the likelihood; and
specifying a position of the object having the second size in the target image based on the extracted coordinates indicating the local maximum value of the likelihood.

2. The object position estimation device according to claim 1, wherein
each coordinate on the first likelihood map corresponds to one position on the target image, and a likelihood at each coordinate on the first likelihood map indicates a probability that the object having the first size is present at the corresponding one position on the target image, or indicates a number of objects having the first size that are additionally present on the target image, and
each coordinate on the second likelihood map corresponds to one position on the target image, and a likelihood at each coordinate on the second likelihood map indicates a probability that the object having the second size is present at the corresponding one position on the target image, or indicates a number of objects having the second size that are additionally present on the target image.

3. The object position estimation device according to claim 1, wherein
the at least one processor is configured to execute the instructions to perform:
estimating a position of the object having the first size for each attribute of the object of the first size, and
estimating a position of the object having the second size for each attribute of the object of the second size.

4. The object position estimation device according to claim 1, wherein
the at least one processor is further configured to execute the instructions to perform:
counting a total number of objects having the first size in the target image based on the first feature map; and
counting a total number of objects having the second size in the target image based on the second feature map.

5. The object position estimation device according to claim 1, wherein
the at least one processor is further configured to execute the instructions to perform:
causing each unit of the object position estimation device to perform training in such a way as to reduce an error with respect to a correct value obtained in advance in the first likelihood map and the second likelihood map.

6. The object position estimation device according to claim 5, wherein
the at least one processor is further configured to execute the instructions to perform:
generating training data to be used for training based on a training image and object information, wherein
the training data includes the training image, the object information, and the correct value,
the correct value includes a first correct likelihood map and a second correct likelihood map, and
the first correct likelihood map indicates a position and a spread of an object area for the object of the first size in the training image, and the second correct likelihood map indicates a position and a spread of an object area for the object of the second size in the training image.

7. The object position estimation device according to claim 6, wherein
the at least one processor is configured to execute the instructions to perform:
calculating a first loss indicating an error between the first likelihood map and the second likelihood map with respect to the correct value by using the first correct likelihood map and the second correct likelihood map included in the training data as the correct value.

8. The object position estimation device according to claim 1, wherein
the first size is any size within a first predetermined range from a first minimum size to a first maximum size,
the second size is any size within a second predetermined range from a second minimum size to a second maximum size, the first predetermined range and the second predetermined range do not overlap, and the second size is larger than the first size.

9. The object position estimation device according to claim 1, wherein
the first size and the second size are proportional to reciprocals of data sizes of the first feature map and the second feature map.

10. An object position estimation method comprising:
generating a first feature map by performing convolution processing on a target image, and generating a second feature map by further performing convolution processing on the first feature map;
estimating a first likelihood map indicating a probability that an object having a first size is present at each position of the target image using the first feature map, and estimating a second likelihood map indicating a probability that an object having a second size larger than the first size is present at each position of the target image using the second feature map;
specifying positions of objects having the first size in the target image based on coordinates indicating a local maximum value of likelihood in the first likelihood map;
specifying positions of objects having the second size in the target image based on coordinates indicating a local maximum value of likelihood in the second likelihood map;
calculating a total number of objects having the first size in the target image from a sum of entire likelihood of the first likelihood map, or count a total number of objects having the first size in the target image;
extracting a same number of coordinates as the total number of objects having the first size from among coordinates indicating the local maximum value of the likelihood in the first likelihood map, in descending order of the local maximum value of the likelihood,
specifying a position of the object having the first size in the target image based on the extracted coordinates indicating the local maximum value of the likelihood,
calculating a total number of objects having the second size in the target image from a sum of entire likelihood of the second likelihood map, or count a total number of objects having the second size in the target image,
extracting a same number of coordinates as the total number of objects having the second size from among the coordinates indicating the local maximum value of the likelihood in the second likelihood map, in descending order of the local maximum value of the likelihood; and
specifying a position of the object having the second size in the target image based on the extracted coordinates indicating the local maximum value of the likelihood.

11. A non-transitory recording medium for causing a computer to execute:
generating a first feature map by performing convolution processing on a target image, and generating a second feature map by further performing convolution processing on the first feature map;
estimating a first likelihood map indicating a probability that an object having a first size is present at each position of the target image using the first feature map, and estimating a second likelihood map indicating a probability that an object having a second size larger than the first size is present at each position of the target image using the second feature map;
specifying positions of objects having the first size in the target image based on coordinates indicating a local maximum value of likelihood in the first likelihood map;
specifying positions of objects having the second size in the target image based on coordinates indicating a local maximum value of likelihood in the second likelihood map;

calculating a total number of objects having the first size in the target image from a sum of entire likelihood of the first likelihood map, or count a total number of objects having the first size in the target image;

extracting a same number of coordinates as the total number of objects having the first size from among coordinates indicating the local maximum value of the likelihood in the first likelihood map, in descending order of the local maximum value of the likelihood, specifying a position of the object having the first size in the target image based on the extracted coordinates indicating the local maximum value of the likelihood, calculating a total number of objects having the second size in the target image from a sum of entire likelihood of the second likelihood map, or count a total number of objects having the second size in the target image, extracting a same number of coordinates as the total number of objects having the second size from among the coordinates indicating the local maximum value of the likelihood in the second likelihood map, in descending order of the local maximum value of the likelihood; and specifying a position of the object having the second size in the target image based on the extracted coordinates indicating the local maximum value of the likelihood.

* * * * *